United States Patent
Ono

(10) Patent No.: US 9,239,452 B2
(45) Date of Patent: Jan. 19, 2016

(54) VARIABLE MAGNIFICATION OPTICAL SYSTEM AND IMAGING APPARATUS

(71) Applicant: FUJIFILM CORPORATION, Tokyo (JP)

(72) Inventor: Kazunori Ono, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/489,542

(22) Filed: Sep. 18, 2014

(65) Prior Publication Data

US 2015/0002943 A1 Jan. 1, 2015

Related U.S. Application Data

(63) Continuation of application No. PCT/JP2013/001170, filed on Feb. 27, 2013.

(30) Foreign Application Priority Data

Mar. 26, 2012 (JP) ................. 2012-069126

(51) Int. Cl.
*G02B 15/14* (2006.01)
*G02B 15/20* (2006.01)
*G02B 13/18* (2006.01)
*G02B 15/173* (2006.01)
(Continued)

(52) U.S. Cl.
CPC *G02B 15/20* (2013.01); *G02B 9/34* (2013.01); *G02B 13/18* (2013.01); *G02B 15/173* (2013.01); *H04N 5/23296* (2013.01)

(58) Field of Classification Search
CPC ...... G02B 15/173; G02B 7/10; G02B 13/009; G02B 7/04; G02B 15/167; G02B 7/09; G02B 9/34; G02B 9/64

USPC .................................................. 359/687, 684
See application file for complete search history.

(56) References Cited

U.S. PATENT DOCUMENTS 7,450,315 B2  11/2008  Tomioka
8,228,605 B2  7/2012  Arakawa et al.
(Continued)

FOREIGN PATENT DOCUMENTS

JP  H06-230317  8/1994
JP  2007-328006  12/2007
(Continued)

OTHER PUBLICATIONS

International Search Report—PCT/JP2013/001170—Jun. 25, 2013.

*Primary Examiner* — Alicia M Harrington
(74) *Attorney, Agent, or Firm* — Young & Thompson

(57) ABSTRACT

In a variable magnification optical system, consisting of a first lens group having a positive refractive power, a second lens group having a negative refractive power, a third lens group having a positive refractive power, and a fourth lens group having a positive refractive power, arranged in order from the object side, in which magnification is changed by moving the second lens group and focusing is performed by moving the fourth lens group, the first lens group consists of a positive lens and a positive cemented lens, arranged in order from the object side, the third lens group includes an aperture stop on the most object side, the fourth lens group consists of a positive lens, a negative lens, and a positive lens, arranged in order from the object side, with at least one surface being an aspherical surface, and the system satisfies given conditional expressions.

9 Claims, 17 Drawing Sheets

(51) Int. Cl.
*G02B 9/34* (2006.01)
*H04N 5/232* (2006.01)

(56) References Cited

U.S. PATENT DOCUMENTS 8,279,538 B2    10/2012  Oe
2003/0151829 A1*  8/2003  Ori ..................... G02B 15/173
                                                        359/687

2007/0279762 A1    12/2007  Tomioka
2011/0102906 A1    5/2011   Oe
2011/0188117 A1    8/2011   Arakawa et al.

FOREIGN PATENT DOCUMENTS

JP    2009-237400    10/2009
JP    2011-118372    6/2011
JP    2011-158630    8/2011

* cited by examiner

FIG.2 EXAMPLE 2

FIG.4 EXAMPLE 4

FIG.5
EXAMPLE 5
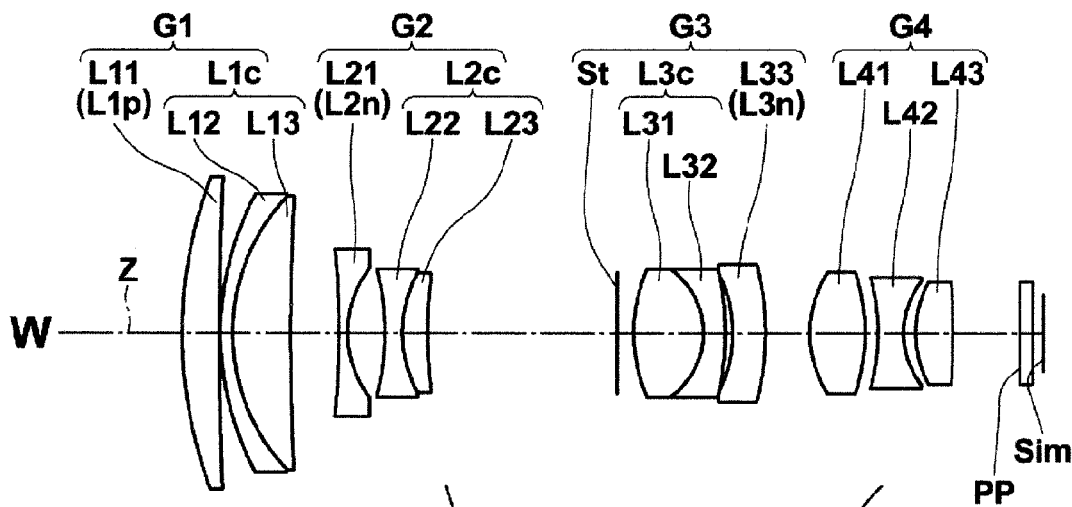
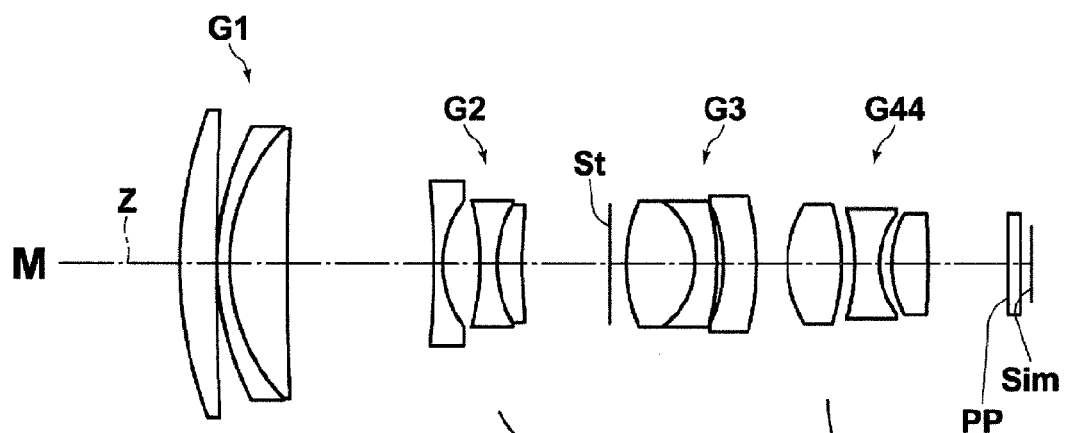
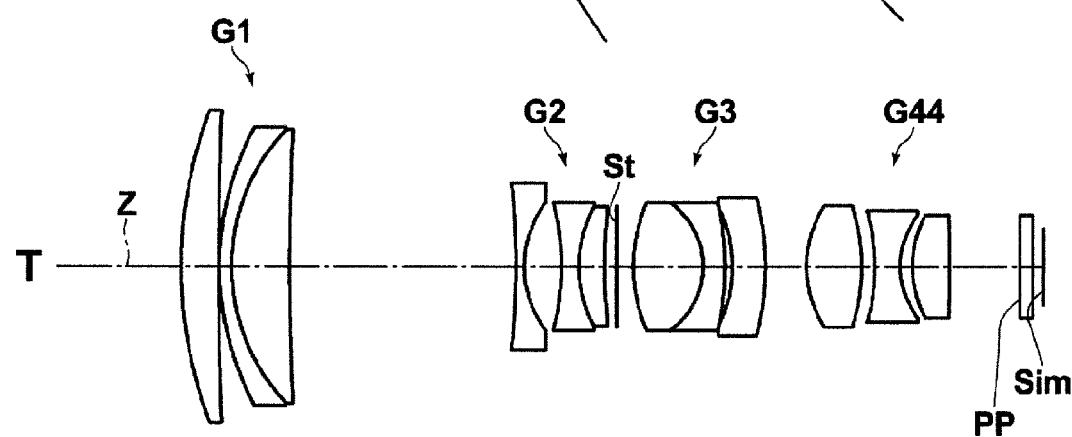

FIG.6  EXAMPLE 6

FIG.7 EXAMPLE 7

FIG.9
EXAMPLE 1
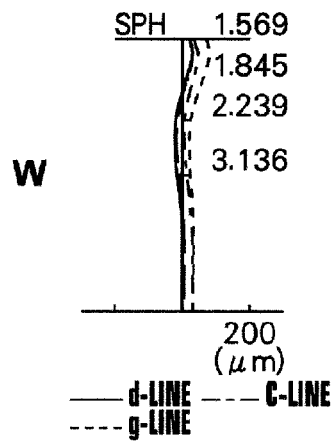
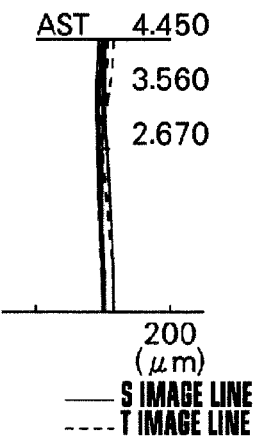
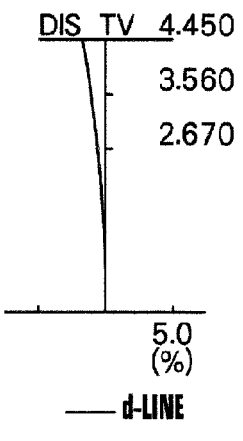
W
A SPHERICAL ABERRATION
B FIELD CURVATURE
C DISTORTION
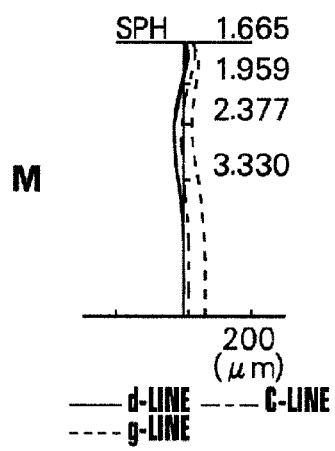
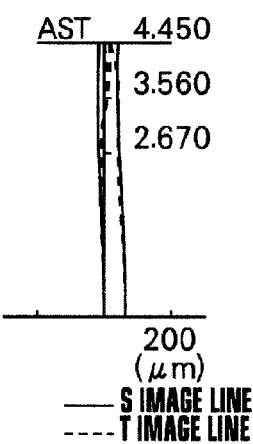
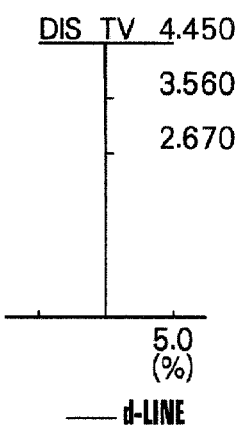
M
D SPHERICAL ABERRATION
E FIELD CURVATURE
F DISTORTION
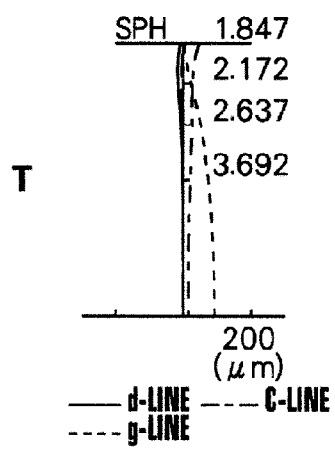
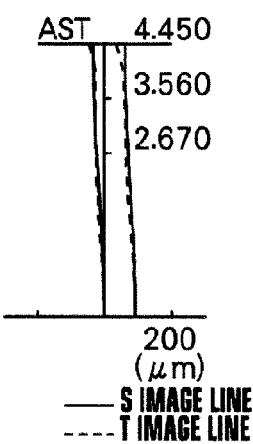
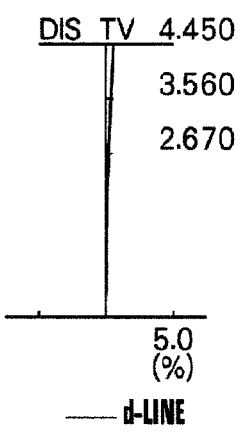
T
G SPHERICAL ABERRATION
H FIELD CURVATURE
I DISTORTION

FIG.10

EXAMPLE 2

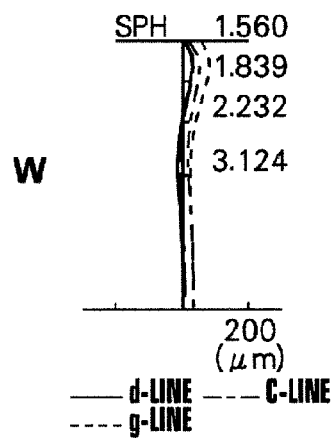

W

A  SPHERICAL ABERRATION
(SPH 1.560, 1.839, 2.232, 3.124; 200 (μm); d-LINE, C-LINE, g-LINE)

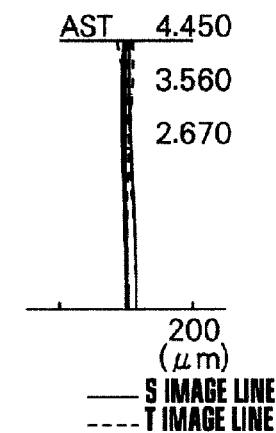

B  FIELD CURVATURE
(AST 4.450, 3.560, 2.670; 200 (μm); S IMAGE LINE, T IMAGE LINE)

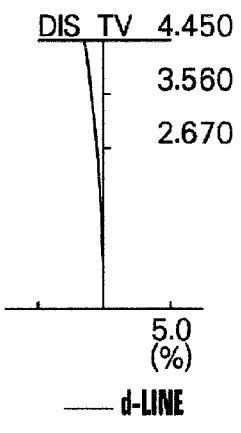

C  DISTORTION
(DIS TV 4.450, 3.560, 2.670; 5.0 (%); d-LINE)

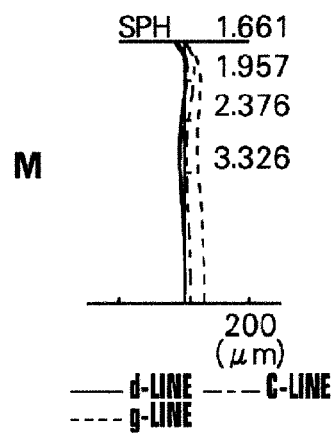

M

D  SPHERICAL ABERRATION
(SPH 1.661, 1.957, 2.376, 3.326; 200 (μm); d-LINE, C-LINE, g-LINE)

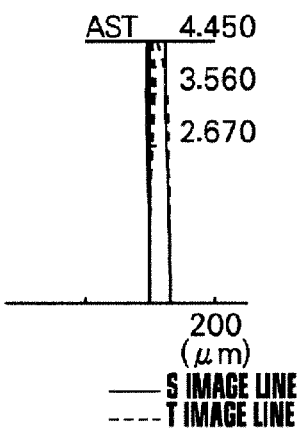

E  FIELD CURVATURE
(AST 4.450, 3.560, 2.670; 200 (μm); S IMAGE LINE, T IMAGE LINE)

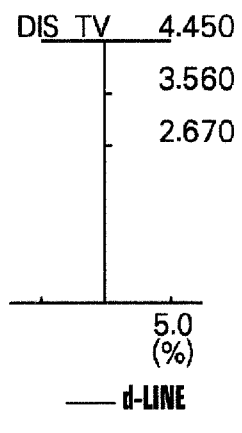

F  DISTORTION
(DIS TV 4.450, 3.560, 2.670; 5.0 (%); d-LINE)

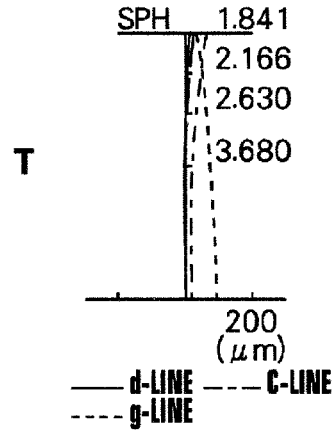

T

G  SPHERICAL ABERRATION
(SPH 1.841, 2.166, 2.630, 3.680; 200 (μm); d-LINE, C-LINE, g-LINE)

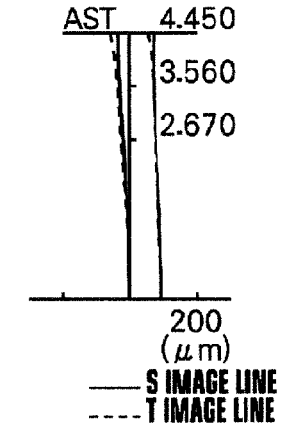

H  FIELD CURVATURE
(AST 4.450, 3.560, 2.670; 200 (μm); S IMAGE LINE, T IMAGE LINE)

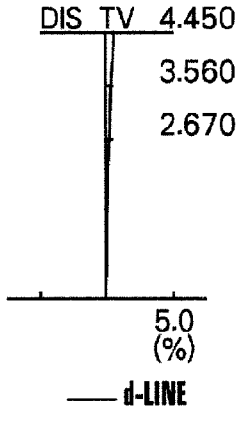

I  DISTORTION
(DIS TV 4.450, 3.560, 2.670; 5.0 (%); d-LINE)

FIG.11
EXAMPLE 3
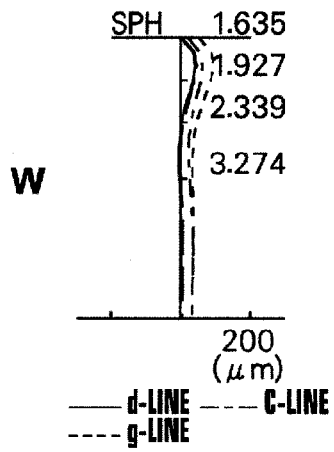
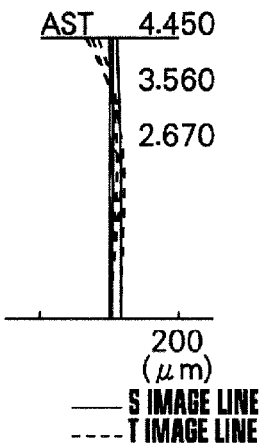
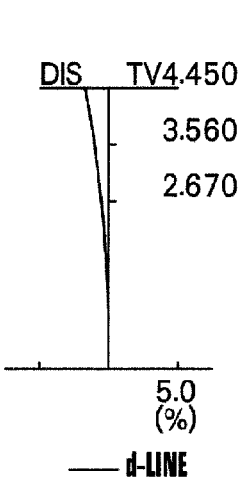
W — SPHERICAL ABERRATION A / FIELD CURVATURE B / DISTORTION C
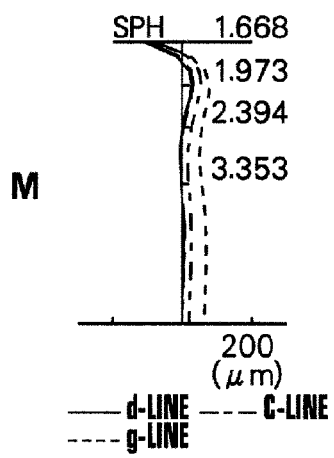
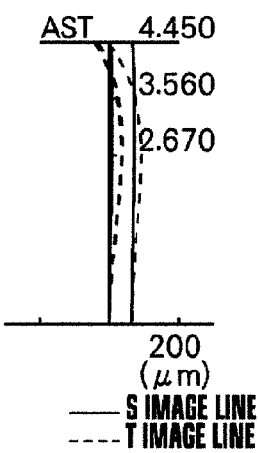
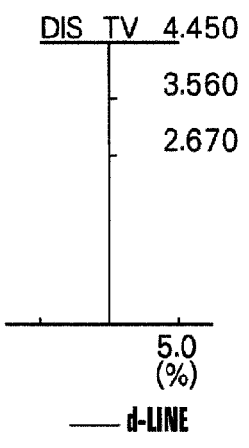
M — SPHERICAL ABERRATION D / FIELD CURVATURE E / DISTORTION F
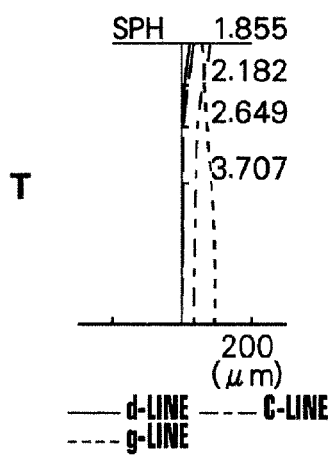
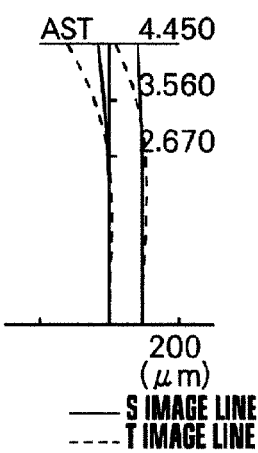
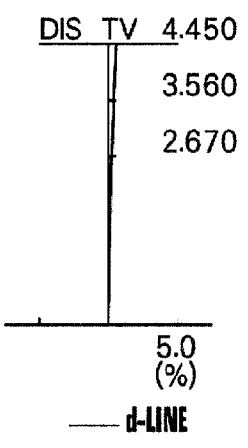
T — SPHERICAL ABERRATION G / FIELD CURVATURE H / DISTORTION I

FIG.12

EXAMPLE 4

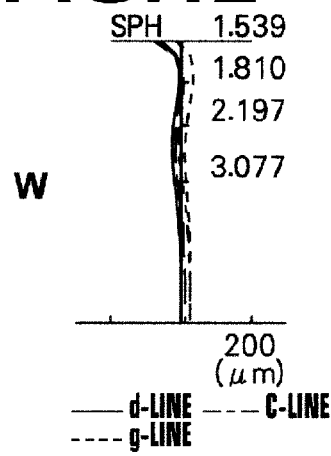

W

SPH  1.539
     1.810
     2.197
     3.077

200
(μm)

— d-LINE  — — C-LINE
- - - g-LINE

SPHERICAL ABERRATION
A

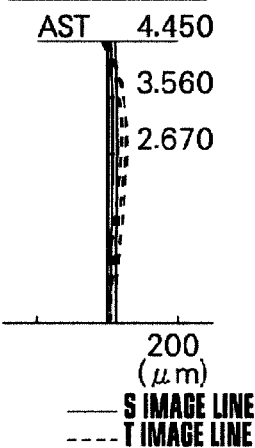

AST  4.450
     3.560
     2.670

200
(μm)

— S IMAGE LINE
- - - T IMAGE LINE

FIELD CURVATURE
B

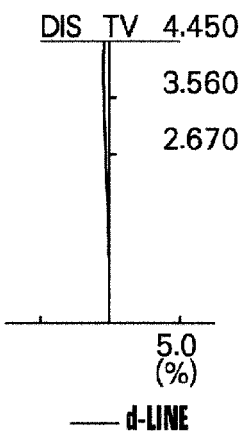

DIS TV  4.450
        3.560
        2.670

5.0
(%)

— d-LINE

DISTORTION
C

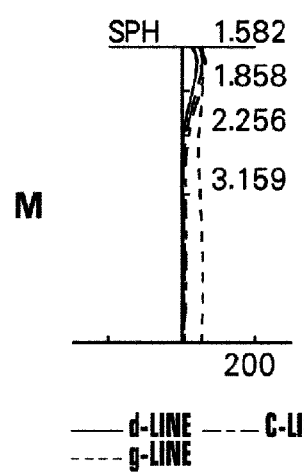

M

SPH  1.582
     1.858
     2.256
     3.159

200

— d-LINE  — — C-LINE
- - - g-LINE

SPHERICAL ABERRATION
D

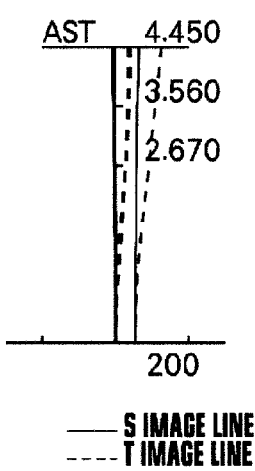

AST  4.450
     3.560
     2.670

200

— S IMAGE LINE
- - - T IMAGE LINE

FIELD CURVATURE
E

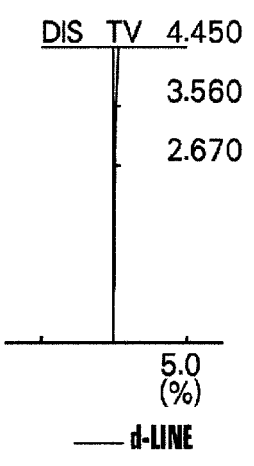

DIS TV  4.450
        3.560
        2.670

5.0
(%)

— d-LINE

DISTORTION
F

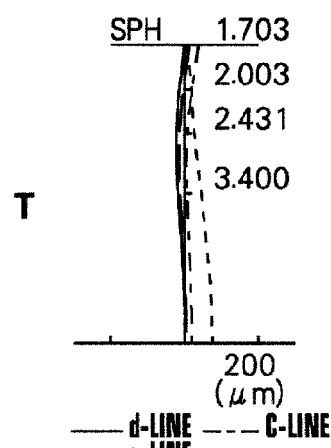

T

SPH  1.703
     2.003
     2.431
     3.400

200
(μm)

— d-LINE  — — C-LINE
- - - g-LINE

SPHERICAL ABERRATION
G

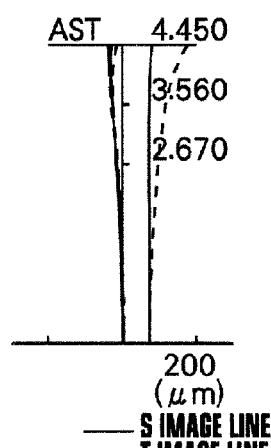

AST  4.450
     3.560
     2.670

200
(μm)

— S IMAGE LINE
- - - T IMAGE LINE

FIELD CURVATURE
H

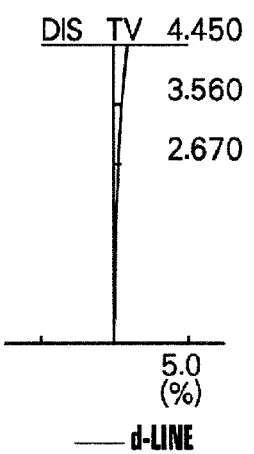

DIS TV  4.450
        3.560
        2.670

5.0
(%)

— d-LINE

DISTORTION
I

FIG. 13
EXAMPLE 5
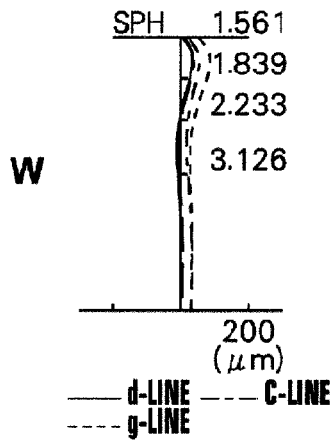
SPHERICAL ABERRATION
A
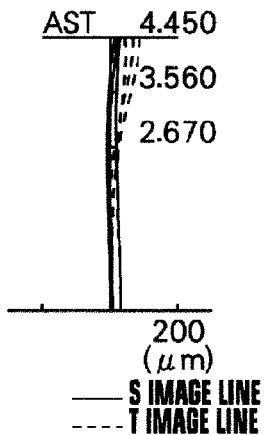
FIELD CURVATURE
B
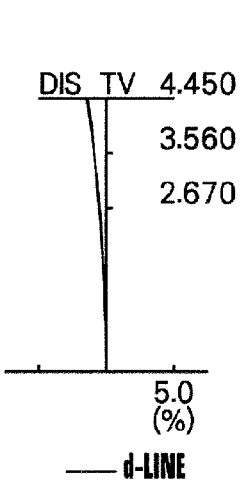
DISTORTION
C
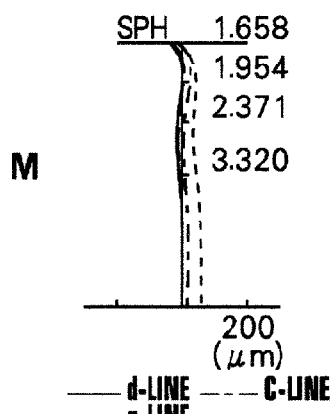
SPHERICAL ABERRATION
D
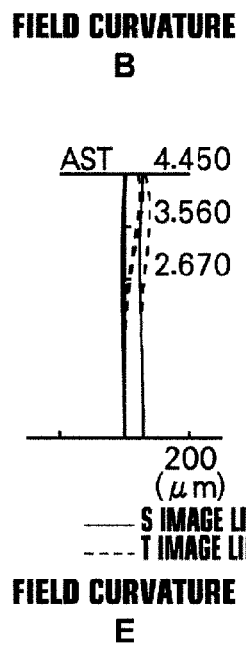
FIELD CURVATURE
E
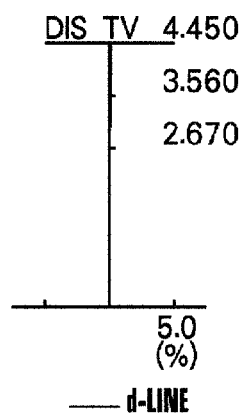
DISTORTION
F
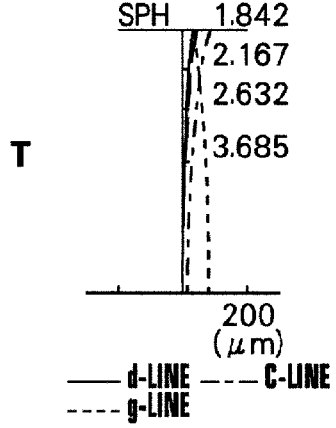
SPHERICAL ABERRATION
G
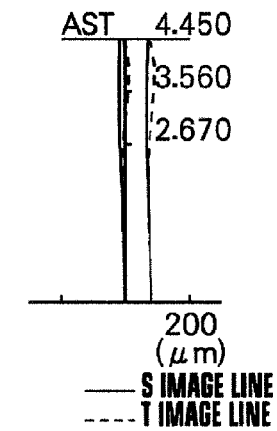
FIELD CURVATURE
H
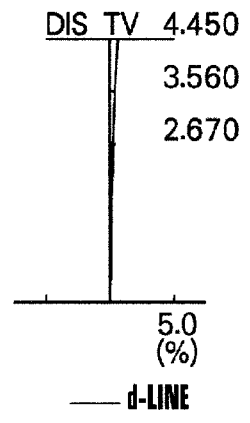
DISTORTION
I

FIG.14   EXAMPLE 6
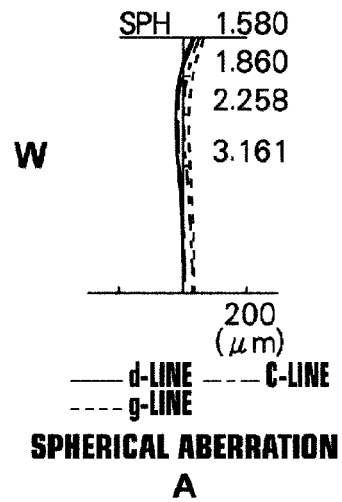
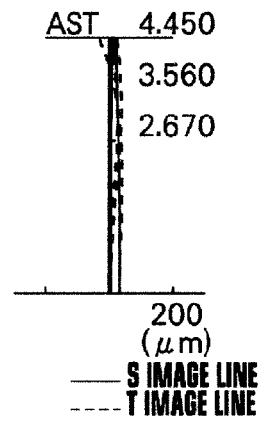
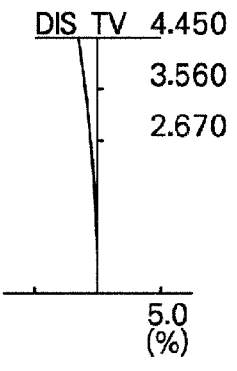
W — A SPHERICAL ABERRATION | B FIELD CURVATURE | C DISTORTION
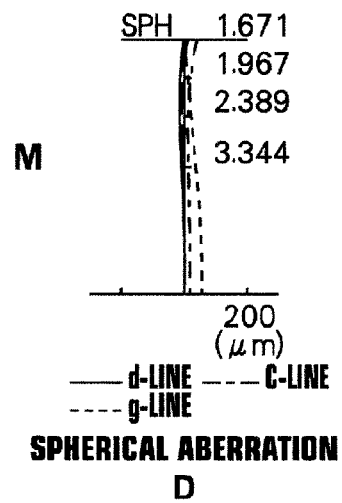
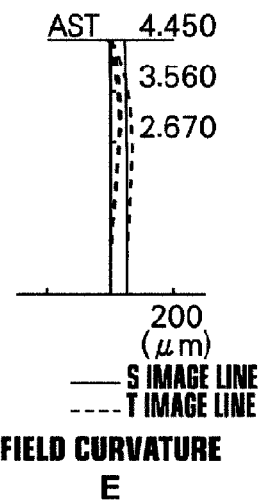
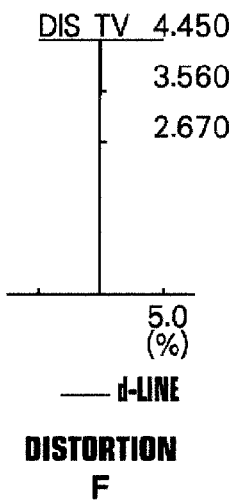
M — D SPHERICAL ABERRATION | E FIELD CURVATURE | F DISTORTION
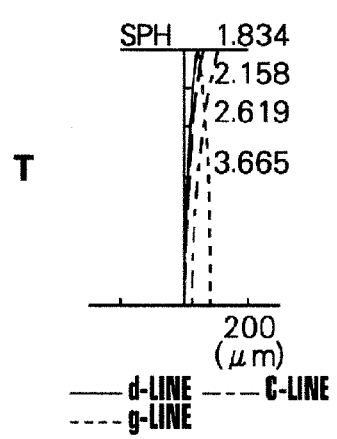
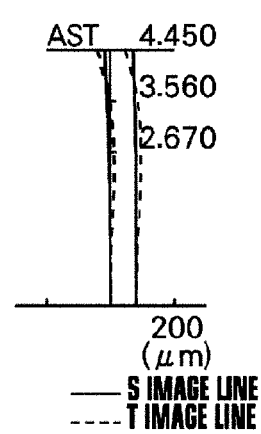
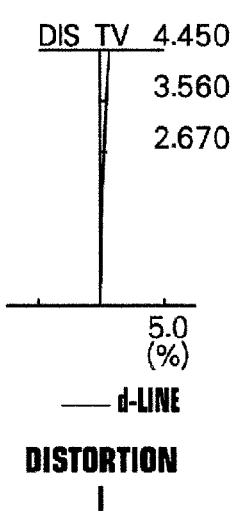
T — G SPHERICAL ABERRATION | H FIELD CURVATURE | I DISTORTION

FIG.15
EXAMPLE 7
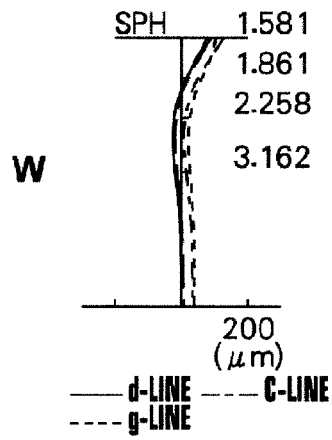
W
SPHERICAL ABERRATION
A
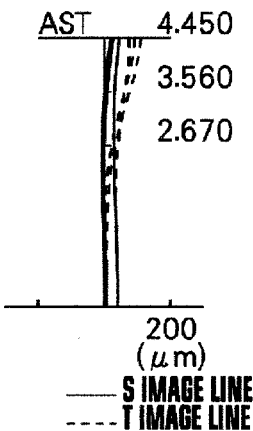
FIELD CURVATURE
B
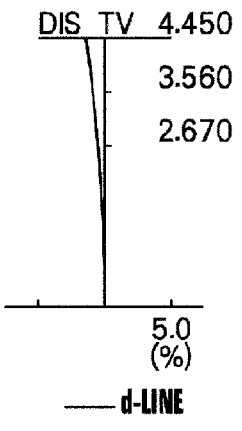
DISTORTION
C
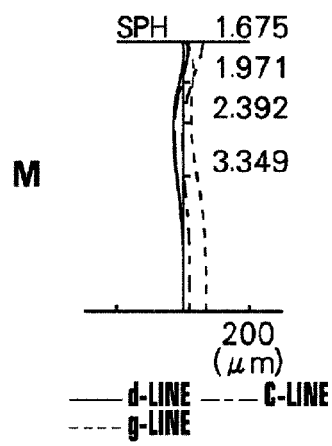
M
SPHERICAL ABERRATION
D
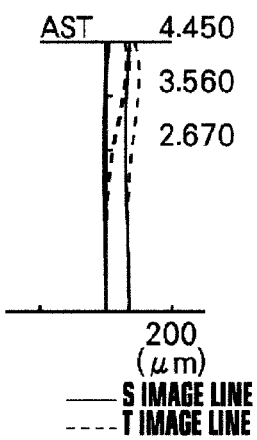
FIELD CURVATURE
E
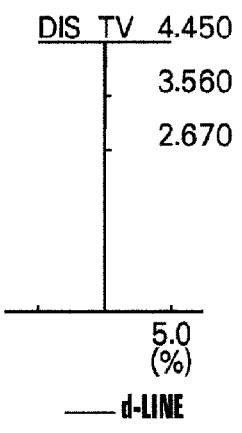
DISTORTION
F
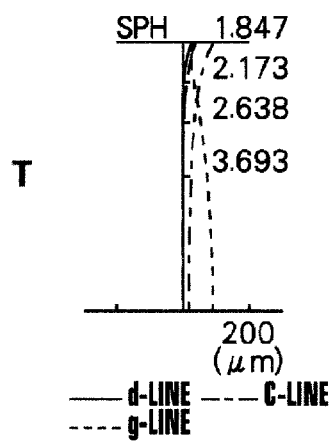
T
SPHERICAL ABERRATION
G
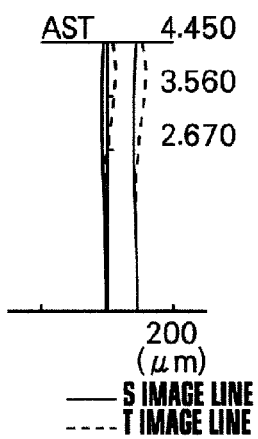
FIELD CURVATURE
H
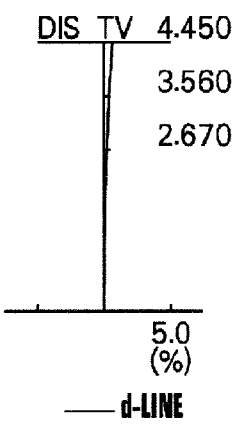
DISTORTION
I

FIG.16
EXAMPLE 8
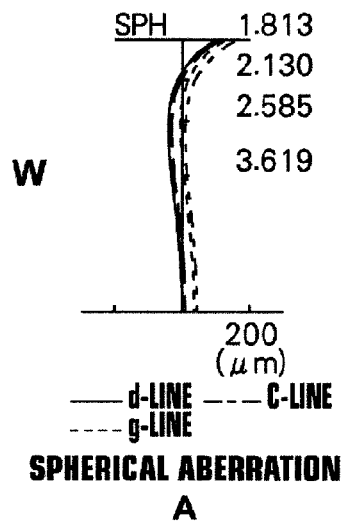
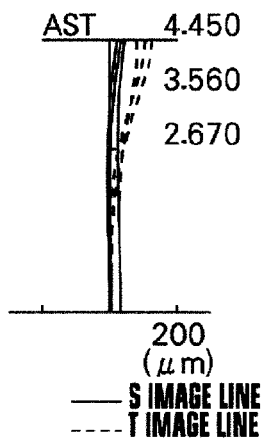
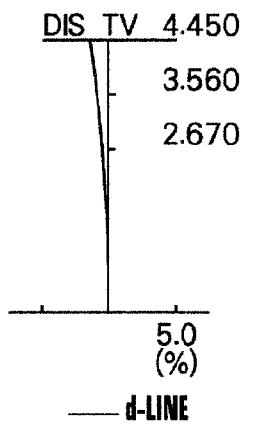
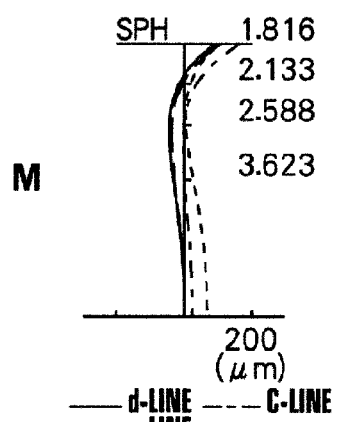
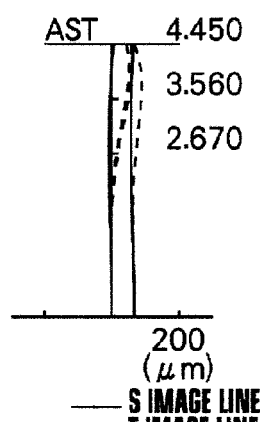
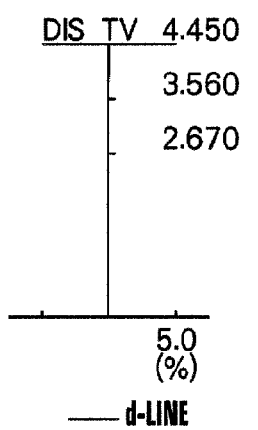
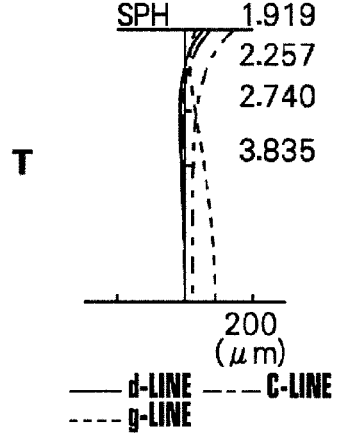
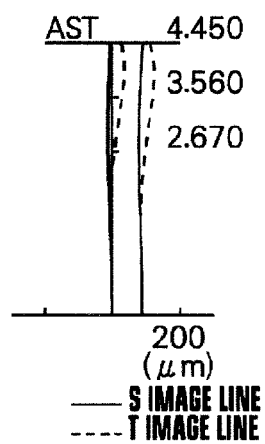
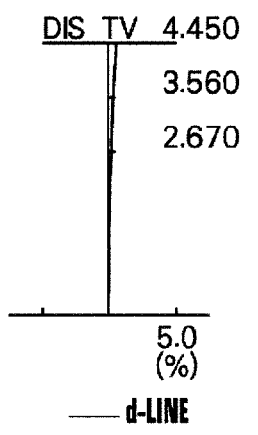

VARIABLE MAGNIFICATION OPTICAL SYSTEM AND IMAGING APPARATUS

CROSS-REFERENCE TO RELATED APPLICATIONS

This application is a Continuation of PCT International Application No. PCT/JP2013/001170 filed on Feb. 27, 2013, which claims priority under 35 U.S.C. §119 (a) to Japanese Patent Application No. 2012-069126 filed on Mar. 26, 2012, the content of which is hereby expressly incorporated herein by reference in its entirety.

BACKGROUND OF THE INVENTION

1. Technical Field

The present invention relates to a variable magnification optical system capable of maintaining the maximum aperture F-number bright from the wide angle end to the telephoto end, and an imaging apparatus which includes the variable magnification optical system.

2. Background Art

As zoom lenses (variable magnification optical systems) for use with CCTV (Closed-circuit Television) designed to meet the surveillance camera specifications that can be used both in visible region and near infrared region, and allow image capturing even at night as well as during the day, a plurality of four group zoom lenses having positive, negative, positive, and positive refractive powers has been proposed in the past (Japanese Unexamined Patent Publication No. 2011-118372, Japanese Unexamined Patent Publication No. 6(1994)-230317, Japanese Unexamined Patent Publication No. 2011-158630, and the like). The four group zoom lenses having positive, negative, positive, and positive refractive powers have many advantages, including ease of handling along with the simplicity of the lens barrel·magnification change mechanism and such configuration has conventionally been employed frequently.

Note that such zoom lenses may well be used for imaging devices, other than CCTV, such as video cameras, electronic still cameras, and the like, having image sensors, such as CCD (Charge Coupled Device), CMOS (Complementary Metal Oxide Semiconductor) and the like as recording media.

DISCLOSURE OF THE INVENTION

Generally, zoom lenses have a strong tendency that the brightness at the telephoto end is darker than the brightness at the wide angle end. This is because the input pupil diameter is increased by the multiplication of the zoom ratio upon magnification in the case of general zoom lenses. In order to eliminate this problem, if the zoom lens is configured to capture a light beam corresponding to the increased entrance pupil diameter, the diameter of the front lens element is increased, thereby compromising the compactness and increasing cost. Further, aberration correction at the telephoto end is difficult and requires an increased number of lens elements or the use of anomalous dispersion glass, thereby causing a further const increase.

For example, the brightness of the zoom lens described in Japanese Unexamined Patent Publication No. 2011-118372 is about F1.4 at the wide angle end while about F2.5 in the telephoto end, thus the brightness at the telephoto end is insufficient.

Further, in the zoom lens described in Japanese Unexamined Patent Publication No. 6(1994)-230317, the brightness at the telephoto end is identical to the brightness at the wide angle end, but the diameter of the lens barrel is increased as the diameter of the front lens element is large.

In the zoom lens described in Japanese Unexamined Patent Publication No. 2011-158630, the first lens group having a largest outer diameter is moved during magnification change, so that the lens barrel is further increased and the mechanical structure is complicated as well.

Recently, the demand for brighter zoom lens at the telephoto end that allows enlarged visibility is increasing.

The present invention has been developed in view of the circumstances described above and it is an object of the present invention to provide a variable magnification optical system which is bright also at the telephoto end while maintaining favorable performance, and an imaging apparatus which includes the variable magnification optical system.

A variable magnification optical system of the present invention is a variable magnification optical system, consisting of a first lens group fixed with respect to the imaging plane and has a positive refractive power, a second lens group having a negative refractive power, a third lens group fixed with respect to the imaging plane and has a positive refractive power, and a fourth lens group having a positive refractive power, arranged in order from the object side, in which magnification is changed by moving the second lens group and focusing is performed by moving the fourth lens group, wherein the first lens group consists of a positive lens L1$p$ and a cemented lens L1$c$ consists of a negative lens and a positive lens, and has a positive refractive power, arranged in order from the object side, the third lens group includes a stop on the most object side, the fourth lens group consists of a positive lens, a negative lens, and a positive lens, arranged in order from the object side, with at least one surface being an aspherical surface, and the variable magnification optical system satisfies conditional expressions given below:

$$3.1 < f1/fw < 8.0 \tag{1}$$

$$0.4 < f1p/f1c < 2.0 \tag{2}$$

$$0.3 < R1c/fw < 0.7 \tag{3}$$

$$1.0 \leq FNt/FNw < 1.4 \tag{4}$$

$$1.5 < FNt < 2.3 \tag{5}$$

where, f1: focal length of the first lens group, fw: focal length of the entire system at the wide angle end, f1$p$: focal length of the positive lens L1$p$, f1$c$: focal length of the cemented lens L1$c$, R1$c$: radius of curvature of the cemented surface of the cemented lens, FNt: maximum aperture F-number of the entire system at the telephoto end, and FNw: maximum aperture F-number of the entire system at the wide angle end.

In this case, the variable magnification optical system preferably satisfies conditional expressions given below:

$$3.5 < f1/fw < 5.0 \tag{1-1}$$

$$0.8 < f1p/f1c < 1.9 \tag{2-1}$$

$$0.35 < R1c/fw < 0.5 \tag{3-1}$$

$$1.0 \leq FNt/FNw < 1.3 \tag{4-1}$$

$$1.6 < FNt < 2.0 \tag{5-1}$$

Further, the third lens group includes at least a stop, a cemented lens L3$c$ consists of a biconvex lens and a negative lens having a concave surface on the object side with an absolute value of radius of curvature smaller than that of the image side surface, and a negative lens L3$n$ having a concave surface on the object side with an absolute value of radius of curvature smaller than that of the image side surface, arranged in order from the object side, and the variable magnification optical system satisfies conditional expressions given below:

$$2.2 < f3/fw < 5.0 \quad (6)$$

$$0.3 < f3c/f3 < 2.0 \quad (7)$$

$$-2.5 < f3n/f3 < -0.4 \quad (8)$$

$$50 < vdn \le vdp \quad (9)$$

where, f3: focal length of the third lens group, f3c: focal length of the cemented lens L3c, f3n: focal length of the negative lens L3n, vdp: Abbe number of the positive lens in the cemented lens L3c, and vdn: Abbe number of the negative lens in the cemented lens L3c.

In this case, the variable magnification optical system preferably satisfies conditional expressions given below:

$$2.5 < f3/fw < 4.0 \quad (6\text{-}1)$$

$$0.4 < f3c/f3 < 1.5 \quad (7\text{-}1)$$

$$-2.0 < f3n/f3 < -0.5 \quad (8\text{-}1)$$

$$60 < vdn \le vdp \quad (9\text{-}1)$$

Further, the second lens group consists of a negative lens L2n and a cemented lens L2c consists of a biconcave negative lens and a positive lens, arranged in order from the object side, and the variable magnification optical system satisfies conditional expressions given below:

$$0.8 < |f2|/fw < 1.4 \quad (10)$$

$$-0.7 < \beta 2w < -0.3 \quad (11)$$

$$0.1 < D12w/fw < 0.7 \quad (12)$$

where, f2: focal length of the second lens group, β2w: imaging magnification of the second lens group at the wide angle end, and D12w: distance between the first lens group and the second lens group on the optical axis at the wide angle end.

In this case, the variable magnification optical system preferably satisfies conditional expressions given below:

$$0.9 < |f2|/fw < 1.2 \quad (10\text{-}1)$$

$$-0.6 < \beta 2w < -0.4 \quad (11\text{-}1)$$

$$0.2 < D12w/fw < 0.6 \quad (12\text{-}1)$$

Further, the fourth lens group consists of a biconvex lens, a negative lens having a concave surface on the image side with an absolute value of radius of curvature smaller than that of the object side surface, and a positive lens, arranged in order from the object side, and the variable magnification optical system satisfies a conditional expression given below:

$$1.2 < f4/fw < 2.6 \quad (13)$$

where, f4: focal length of the fourth lens group.

In this case, the variable magnification optical system preferably satisfies a conditional expression given below:

$$1.5 < f4/fw < 2.2 \quad (13\text{-}1)$$

An imaging apparatus of the present invention includes the variable magnification optical system described above.

The variable magnification optical system of the present invention consists of a first lens group fixed with respect to the imaging plane and has a positive refractive power, a second lens group having a negative refractive power, a third lens group fixed with respect to the imaging plane and has a positive refractive power, and a fourth lens group having a positive refractive power, arranged in order from the object side, in which magnification is changed by moving the second lens group and focusing is performed by moving the fourth lens group, wherein the first lens group consists of a positive lens L1p and a cemented lens L1c consists of a negative lens and a positive lens, and has a positive refractive power, arranged in order from the object side, the third lens group includes a stop on the most object side, the fourth lens group consists of a positive lens, a negative lens, and a positive lens, arranged in order from the object side, with at least one surface being an aspherical surface, and the variable magnification optical system satisfies conditional expressions given below. This allows a variable magnification optical system which is bright also at the telephoto end, while maintaining favorable performance to be realized.

$$3.1 < f1/fw < 8.0 \quad (1)$$

$$0.4 < f1p/f1c < 2.0 \quad (2)$$

$$0.3 < R1c/fw < 0.7 \quad (3)$$

$$1.0 \le FNt/FNw < 1.4 \quad (4)$$

$$1.5 < FNt < 2.3 \quad (5)$$

Further, the imaging apparatus of the present invention includes the variable magnification optical system of the present invention so that, even at the telephoto end, bright and high quality images may be obtained.

BRIEF DESCRIPTION OF DRAWINGS

FIG. 5 is a cross-sectional view of a variable magnification optical system of Example 5, illustrating a lens configuration thereof.

FIG. 9 shows aberration diagrams of the variable magnification optical system of Example 1 (A to I).

FIG. 10 shows aberration diagrams of the variable magnification optical system of Example 2 (A to I).

FIG. 11 shows aberration diagrams of the variable magnification optical system of Example 3 (A to I).

FIG. 12 shows aberration diagrams of the variable magnification optical system of Example 4 (A to I).

FIG. 13 shows aberration diagrams of the variable magnification optical system of Example 5 (A to I).

FIG. 14 shows aberration diagrams of the variable magnification optical system of Example 6 (A to I).

FIG. 15 shows aberration diagrams of the variable magnification optical system of Example 7 (A to I).

FIG. 16 shows aberration diagrams of the variable magnification optical system of Example 8 (A to I).

BEST MODE FOR CARRYING OUT THE INVENTION

Figure 1:
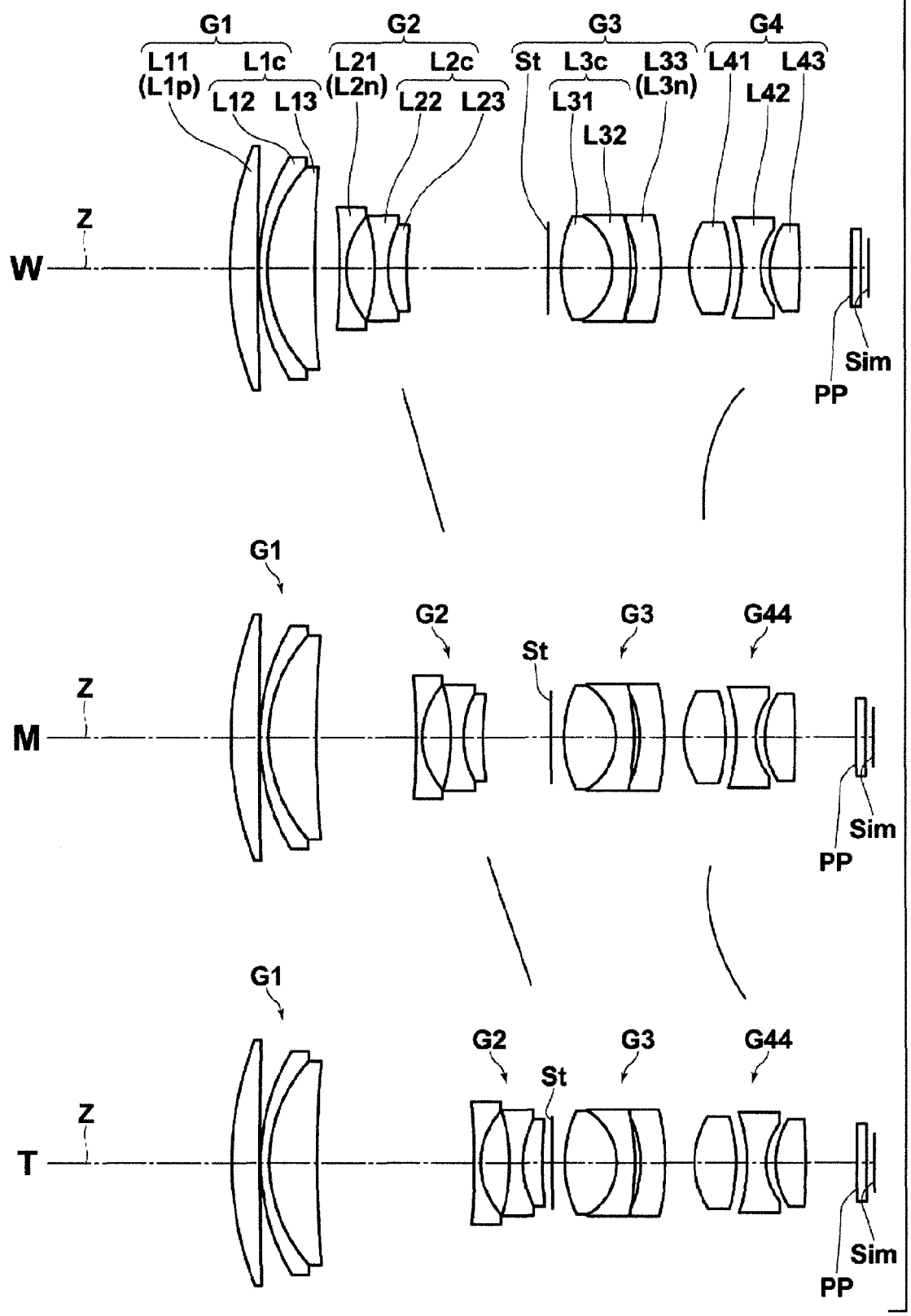
FIG. 1 is a cross-sectional view of a variable magnification optical system (common to Example 1), illustrating a lens configuration thereof.

Hereinafter, embodiments of the present invention will be described in detail with reference to the accompanying drawings. FIG. 1 is a cross-sectional view of a variable magnification optical system (common to Example 1), illustrating a lens configuration thereof. The example configuration shown in FIG. 1 is common to the configuration of a variable magnification optical system of Example 1, to be described later. In FIG. 1, the left side is the object side and the right side is the image side.

The variable magnification optical system consists of a first lens group G1 fixed with respect to the imaging plane and has a positive refractive power, a second lens group G2 having a negative refractive power, a third lens group G3 fixed with respect to the imaging plane and has a positive refractive power, and a fourth lens group G4 having a positive refractive power, arranged along the optical axis Z in order from the object side, in which magnification is changed by moving the second lens group and focusing is performed by moving the fourth lens group. Note that the aperture stop St shown in FIG. 1 does not necessarily represent its size and shape but rather indicates its position on the optical axis Z.

When applying the variable magnification optical system to an imaging apparatus, it is preferable that a cover glass, a prism, and various types of filters, such as a low-pass filter, an infrared cut filter, and the like, are disposed between the optical system and the image plane Sim according to the structure on the camera side on which the lens is mounted, and FIG. 1 illustrates an example in which a parallel plate optical member PP representing these is disposed between the fourth lens group G4 and the image plane Sim. Note that the thickness and properties of the parallel plate member PP should be considered according to the required performance, and the position, thickness, and performance are not limited here. Further, the optical member PP may not be disposed.

The first lens G1 consists of a positive lens L11 (L1$p$ in claims) and a cemented lens L1$c$ which consists of a negative lens L12 and a positive lens L13 and has a positive refractive power, arranged in order from the object side.

The second lens group G2 consists of a negative lens (L2$n$ in claims) and a cemented lens L2$c$ which consists of a biconcave negative lens L22 and a positive lens L23, arranged in order from the object side.

The third lens group G3 consists of an aperture stop St, a cemented lens L3$c$ which consists of a biconvex positive lens L31 and a negative lens having a concave surface on the object side with an absolute value of radius of curvature smaller than that of the image side surface, and a negative lens L33 (L3$n$ in claims) having a concave surface on the object side with an absolute value of radius of curvature smaller than that of the image side surface, arranged in order from the object side.

The fourth lens group G4 consists of a biconvex positive lens L41, a negative lens L42 having a concave surface on the image side with an absolute value of radius of curvature smaller than that of the object side surface, and positive lens L43 arranged in order from the object side, in which the most object side positive lens L41 in the fourth lens group G4 is an aspherical lens.

As it is necessary to satisfactorily correct, in particular, longitudinal chromatic aberration, over a wider wavelength range than usual from the visible to near infrared regions, the use of anomalous dispersion glass is inevitable in the present invention. As the types of anomalous dispersion glass are expensive both in materials and processing, it is necessary to give consideration to make the outer diameter and the center thickness as small as possible.

For that purpose, by arranging the first lens group G1 in the manner described above, the diameter of the center beam at the stop position is reduced in comparison with a negative lens leading conventional first lens group formed of three lenses of negative, positive, and positive lenses, thereby affording to brighten the brightness at the telephoto end.

In the four lens group variable magnification optical system, as in the present invention, the first lens group G1 to the third lens group G3 basically function as a variable magnification afocal system while the fourth lens functions as a master lens group, and the focal length of the entire system corresponds to the multiplication of the focal length of the fourth lens group with the magnification ratio of the variable magnification afocal system.

Therefore, the variable magnification optical system is configured such that the focal length of the fourth lens group G4 is reduced to the extent that the stop diameter and the outer diameter of the third lens group G3, which determine the outer diameter of the lens barrel body, become a minimum required while maintaining a required back focus, and the magnification ratio of the variable magnification afocal system is shifted by a predetermined large amount to the telephoto side to obtain a desired focal length.

This can be achieved, in the nearly afocal configuration of the first lens group G1 having a positive refractive power, the second lens group G2 having a negative refractive power, and the third lens group G3 having a positive refractive power, by increasing the distance between the first lens group G1 and the second lens group G2 from the wide angle end to move the second lens group G2 close to the aperture stop St and minimizing the off-axis ray height at the wide angle end and the marginal ray height of the center beam at the telephoto end.

In this case, off-axis rays spread outward at the wide angle end but it can be made comparable to the center beam diameter at the telephoto end by adjusting the range of the angle of view between the wide angle end and the telephoto end. Further, the large shift of the aforementioned afocal magnification ratio leads to that the second lens group G2 comes close to the aperture stop, whereby the effective lens diameter of the second lens group G2 and the diameter of the aperture stop are reduced. Conversely speaking, it is also a factor that makes the telephoto end bright.

The configuration of the fourth lens group G4 in the manner described above may provide a uniform and high performance image quality over the entire picture plane while maintaining brightness over the entire range with F-numbers of about F1.5 to F1.8 at the wide angle end and about F1.7 to F1.9 at the telephoto end, though it is a simple configuration.

In performance consideration to ensure a bright F-number at the telephoto end which is the main object of the present invention, the refractive power distribution of the lenses in the first lens group G1 whose center beam diameter at the telephoto end becomes largest is important along with the refractive power distribution of the first lens group G1 with respect to the entire system. In the present invention, the first lens group consists of a positive lens L11 (L1p in claims) and a cemented lens L1c which consists of a negative lens L12 and a positive lens L13, and has a positive refractive power arranged in order from the object side, and is configured so as to satisfy conditional expressions (1) to (5) given below:

$$3.1 < f1/fw < 8.0 \quad (1)$$

$$0.4 < f1p/f1c < 2.0 \quad (2)$$

$$0.3 < R1c/fw < 0.7 \quad (3)$$

$$1.0 \leq FNt/FNw < 1.4 \quad (4)$$

$$1.5 < FNt < 2.3 \quad (5)$$

where, f1: focal length of the first lens group, fw: focal length of the entire system at the wide angle end, f1p: focal length of the positive lens L11 (L1p), f1c: focal length of the cemented lens L1c, R1c: radius of curvature of the cemented surface of the cemented lens L1c, FNt: maximum aperture F-number of the entire system at the telephoto end, and FNw: maximum aperture F-number of the entire system at the wide angle end.

The conditional expression (1) defines the refractive power distribution of the first lens group G1 with respect to the entire system. If the system falls below the lower limit of the conditional expression (1), the refractive power of the first lens group G1 is increased and the brightness of the telephoto side may be made bright by an amount corresponding to the amount of reduction in the diameter of the aperture stop, but the focal length of the entire system is reduced and excessive spherical aberration and field tilt occur. At this time, the influence of the excessive field tilt is stronger than the influence of the spherical aberration at the wide angle side, while, in contrast, the influence of the excessive spherical aberration prevails in the telephoto side, and imaging performance may not be maintained uniform and favorably over the entire picture plane. If the system exceeds the upper limit of the conditional expression (1), the refractive power of the first lens group G1 is reduced and the maximum aperture F-number becomes dark. In addition, insufficiently corrected spherical aberration and field curvature occur, in particular, at the telephoto end, and also imaging performance may not be uniform over the entire area.

The conditional expression (2) relates to refractive power distribution between the object side positive lens L11 (L1p) and the image side cemented lens L1c that form the first lens group G1. In order to make the maximum aperture F-number bright at the telephoto end, the refractive powers of the positive lens L11 (L1p) and the cemented lens L1c are preferably equalized to a certain extent from the viewpoint of aberration correction. If the system falls below the lower limit of the conditional expression (2), the refractive power of the object side positive lens L11 (L1p) becomes too strong, and spherical aberration and field tilt are insufficiently corrected, in particular, on the telephoto side, thereby resulting in significant performance degradation. In order to eliminate this and try to increase the negative refractive power at the cemented surface of the positive cemented lens L1c that follows, if the difference in refractive power between the negative lens L12 and the positive lens L13 is further increased or the cemented lens surface is separated, the cost is increased and high assembly accuracy is required, which are undesirable. If the system exceeds the upper limit of the conditional expression (2), spherical aberration and field curvature are excessively corrected this time, whereby imaging performance is degraded, in particular, on the telephoto side.

The conditional expression (3) represents the relationship between the radius of curvature of the cemented surface of the cemented lens L1c and the focal length fw of the entire system at the wide angle end. If the system falls below the lower limit of the conditional expression (3), the negative refractive power of the cemented surface becomes excessive, and spherical aberration, field curvature, and chromatic aberration are degraded, in particular, on the telephoto side. Further, the radius of curvature becomes too small in comparison with the lens outer diameter and processing of the lens is difficult. If the system exceeds the upper limit of the conditional expression (3), the negative refractive power of the cemented surface becomes in sufficient this time and the secondary spectrum becomes too large, whereby the color bleeding and lateral chromatic aberration become large, thereby affecting imaging performance, in particular, on the telephoto side.

The conditional expression (4) defines that the brightness at the telephoto end does not become too dark at maximum aperture F-number, which is the object of the present invention. In the case of a variable magnification configuration in which the first lens group G1 and the third lens group G3 are fixed, as in the present invention, the F-number that defines the brightness is nearly constant regardless of the magnification if the stop is made small. The reason why the F-number becomes dark at maximum stop is that a certain effective diameter in the lens system is too small to cover the maximum stop. In a configuration, as in the present invention, the area between the third lens group G3 and the fourth lens group G4 is nearly afocal and, as the third lens group G3, including the aperture stop St, is fixed with respect to the image plane, the center beam diameter does not substantially change by magnification change and the back focus does not change much, so that the F-number is nearly constant. In the first lens group G1 and the second lens group G2, however, the entrance pupil diameter changes with the movement of the second lens group G2 for magnification change and the effective diameter also changes. The center beam diameter is large at the telephoto end while the effective diameter of the off-axis rays is large on the wide angle side, and the lens outer diameter is generally defined by the effective diameter of the off-axis rays on the wide angle side and the effective diameter of the center beam at the wide angle end. Conventionally, the F-number at the telephoto end is often determined depending on the effective diameter at the wide angle end. Note that a zoom lens of constant brightness by a variable stop has been developed, but the mechanism is complicated and the lens system becomes large, so that it is not regarded as the specifications that meet the cost.

The present invention employs a configuration in which the maximum aperture F-number does not change much in consideration of change in the angle of view between the wide angle side and the telephoto side. The conditional expression (4) defines such effects, and if the system falls below the lower limit of the conditional expression (4), a problem arises that the effective lens diameter of the first lens group G1 becomes too large and imaging performance is degraded, although the brightness (F-number) at the telephoto end becomes brighter than that at the wide angle end. It is also possible to control such that the maximum aperture F-number becomes darker at the wide angle end than on the telephoto side by the stop mechanism, but it is not particularly required from the viewpoint of performance and peripheral light intensity and does not have any special meaning. If the system exceeds the upper limit of the conditional expression (4), problems arise that F-number is too dark at the telephoto end, peripheral light intensity is too small at the wide angle end, and the like.

The conditional expression (5) defines that the maximum aperture F-number at the telephoto end is also within an intended specification range. If the system falls below the lower limit of the conditional expression (5), the maximum aperture F-number at the telephoto end becomes too bright and the number of constituent elements need to be increased in order to maintain the imaging performance, leading to increased size of the lens system and cost. If the system exceeds the upper limit of the conditional expression (5), the system cannot meet the specifications requested from the market and the system becomes a somewhat dark variable magnification optical system from the wide angle end.

Note that the system can be a further high performance variable magnification optical system by satisfying conditional expression (1-1) to (5-1) given below.

$$3.5 < f1/fw < 5.0 \qquad (1\text{-}1)$$

$$0.8 < f1p/f1c < 1.9 \qquad (2\text{-}1)$$

$$0.35 < R1c/fw < 0.5 \qquad (3\text{-}1)$$

$$1.0 \le FNt/FNw < 1.3 \qquad (4\text{-}1)$$

$$1.6 < FNt < 2.0 \qquad (5\text{-}1)$$

Further, the variable magnification optical system according to the present embodiment preferably satisfies conditional expressions (6) to (9) given below.

$$2.2 < f3/fw < 5.0 \qquad (6)$$

$$0.3 < f3c/f3 < 2.0 \qquad (7)$$

$$-2.5 < f3n/f3 < -0.4 \qquad (8)$$

$$50 < vdn \le vdp \qquad (9)$$

where, f3: focal length of the third lens group G3, f3c: focal length of the cemented lens L3c, f3n: focal length of the negative lens L33 (L3n), vdp: Abbe number of the positive lens L31 in the cemented lens L3c, and vdn: Abbe number of the negative lens L32 in the cemented lens L3c.

The conditional expression (6) defines the refractive power distribution of the third lens group G3 with respect to the entire system. As describe above, a four group variable magnification optical system, as in the present invention, is based on a nearly afocal configuration from the first lens group G1 having a positive refractive power, the second lens group G2 having a negative refractive power, to the third lens group G3 having a positive refractive power. Consequently, if the refractive power of the third lens group G3 fixed with respect to the imaging plane is changed, the refractive powers of the first lens group G1 and the second lens group G2 are also changed. If the refractive power of the third lens group G3 is increased, the refractive powers of the first lens group G1 and the second lens group G2 also need to be increased in terms of absolute value. If the system falls below the lower limit of the conditional expression (6), the refractive power of the third lens group G3 is increased and the refractive powers of the first lens group G1 and the second lens group G2 also need to be increased in terms of absolute value, an aberration variation during magnification change becomes too large and favorable imaging performance cannot be maintained over the entire range of magnification change, although it is effective for the downsizing of the entire optical system as the amount of movement of the second lens group G2 during magnification change is reduced. If the system exceeds the upper limit of the conditional expression (6), the amount of movement of the second lens group G2 in the magnification range is increased and the entire optical system becomes large, whereby overall length and lens diameter are increased, so that the compactness is compromised, although imaging performance is improved.

The conditional expression (7) defines the refractive power distribution of the positive cemented lens L3c with respect to the third lens group G3, and a condition for maintaining primarily spherical aberration and longitudinal chromatic aberration favorably throughout the entire system. If the system falls below the lower limit of the conditional expression (7), the refractive power of the positive cemented lens L3c becomes too large and large adverse effects may result, such as the absolute value of the negative refractive power of the negative lens L33 (L3n) becomes large in order to maintain the refractive power of the third group and the third lens group G3 becomes a lens system having a small telephoto ratio, the back focus of the entire system becomes too small, the diverging effect of the off-axis light is encouraged and flatness of the field curvature is degraded over the entire picture plane. If the system exceeds the upper limit of the conditional expression (7), the refractive power of the positive cemented lens L3c becomes too weak, the back focus of the entire system is increased too large, and the ray height of the off-axis peripheral beam at the fourth lens group is further increased, whereby the effective lens diameters of the third lens group G3 and the fourth lens group G4 are eventually increased too much and the downsizing of the entire optical system is compromised, and bright maximum aperture F-number at the telephoto end may not be maintained.

The conditional expression (8) defines the refractive power distribution of the negative lens L33 (L3n) with respect to the third lens group G3. If the system exceeds the upper limit of the conditional expression (8), the negative refractive power of the negative lens L33 (L3n) becomes too strong and the positive refractive power of the positive cemented lens L3c needs to be increased, and the telephoto ratio becomes further small and problematic adverse effects as described above occur. If the system falls below the lower limit of the conditional expression (8), the positive refractive power of the positive cemented lens L3c needs to be reduced, thereby causing adverse effects similar to those described above.

The conditional expression (9) relates to the Abbe numbers of glass materials of the positive and negative lenses used in the cemented lens L3c. If the system falls below the conditional expression (9), the materials become a combination of those whose difference in partial dispersion ratio is large in the near infrared region and longitudinal chromatic aberration in the near infrared region becomes an acceptable amount with respect to that of the visible region. If the system exceeds the upper limit of the conditional expression (9), the achromatic condition is not satisfied. In this case, the direction of the radius of curvature of the cemented surface needs to be reversed, but it is undesirable because the third lens group G3 is changed to a configuration preceded by a negative lens, whereby spherical aberration of the entire system becomes excessive, which spoils the performance balance and gives influence on the subsequent lens system.

Note that the system can be a further high performance variable magnification optical system by satisfying conditional expression (6-1) to (9-1) given below.

$$2.5 < f3/fw < 4.0 \qquad (6\text{-}1)$$

$$0.4 < f3c/f3 < 1.5 \qquad (7\text{-}1)$$

$$-2.0 < f3n/f3 < -0.5 \qquad (8\text{-}1)$$

$$60 < vdn \le vdp \qquad (9\text{-}1)$$

In the variable magnification optical system of the present invention, it is preferable that variations in the longitudinal chromatic aberration, off-axis lateral chromatic aberration, and displacement of coma aberration at each wavelength, and the like are suppressed as much as possible from the visible region to the near infrared region over the entire range of magnification change. Further, in order to make the maximum aperture F-number to have a certain level of brightness at the telephoto end, the imaging magnification needs to be shifted toward telephoto side from the wide angle end.

Therefore, it is preferable, in the present invention, that the second lens group G2 is of a configuration in which the negative lens L21 (L2n in claims) and the cemented lens L2c which consists of the biconcave negative lens L22 and the positive lens L23 are arranged in order from the object side, and the system satisfies conditional expressions (10) to (12) given below.

$$0.8 < |f2|/fw < 1.4 \quad (10)$$

$$-0.7 < \beta 2w < -0.3 \quad (11)$$

$$0.1 < D12w/fw < 0.7 \quad (12)$$

where, f2: focal length of the second lens group G2, β2w: imaging magnification of the second lens group G2 at the wide angle end, D12w: distance between the first lens group G1 and the second lens group G2 on the optical axis at the wide angle end.

The conditional expression (10) restricts the influence of the negative refractive power of the second lens group G2 on the entire system. If the system falls below the lower limit of the conditional expression (10), the positive refractive powers of the first lens group G1 and the third lens group G3 are increased, whereby aberration variation becomes too large and the imaging performance cannot be maintained uniformly and favorably over the entire range of magnification change, although it is effective for downsizing of the optical system because the overall length of the optical system is reduced as the movement of the second lens group G2 for a given magnification ratio becomes small, the outer lens diameter of the first lens group G1 is reduced, and the like. If the system exceeds the upper limit of the conditional expression (10), the overall length of the optical system is increased because the amount of movement from the wide angle end to the telephoto end becomes too large, and the diameter of the first lens group G1 is increased, which are undesirable. If the system is within the range of the conditional expression (10) in the lens configuration of the second lens group G2, variations of spherical aberration, field curvature, chromatic aberration, and the like may be suppressed without compromising the compactness and nearly uniform performance may be maintained over the entire picture plane.

The conditional expression (11) relates to an imaging magnification condition of the second lens group G2 with respect to the first lens group G1. As describe above, in the present invention, the imaging magnification is shifted toward telephoto side by forming the first lens group G1 to the third lens group G3 in nearly an afocal configuration in order to make the maximum aperture F-number bright at the telephoto end. This event is formulated as the conditional expression (11). If the system falls below the lower limit of the conditional expression (11), the refractive power of each of the first lens group G1 to the third lens group G3 is increased, whereby aberration variation becomes large and the imaging performance of the entire system cannot be corrected uniformly and favorably, although the brightness may be increased by an amount corresponding to the reduced amount of the focal length of the fourth lens group G4 due to increase in the imaging magnification. If the system exceeds the upper limit of the conditional expression (11), the imaging magnification is reduced and the focal length of the fourth lens group G4 needs to be increased, whereby the diameter of the aperture stop is further increased and the optical system is undesirably increased.

The same applies to the conditional expression (12), and if the system falls below the lower limit of the conditional expression (12), the absolute value of imaging magnification at the wide angle end is reduced, the magnification ratio of the variable magnification afocal system is reduced, and the focal length of the fourth lens group needs to be increased, so that the diameter of the aperture stop is increased, and the diameter of the aperture stop, third lens group G3, and fourth lens group G4 are increased. If the system exceeds the upper limit of the conditional expression (12), aberration variation is increased and imaging performance of the entire system is degraded, although the maximum aperture F-number may be made bright by an amount corresponding to the amount of increase that can be made in the magnification ratio of the afocal system.

Note that the system can be a further high performance variable magnification optical system by satisfying conditional expressions (10-1) to (12-1) given below.

$$0.9 < |f2|/fw < 1.2 \quad (10\text{-}1)$$

$$-0.6 < \beta 2w < -0.4 \quad (11\text{-}1)$$

$$0.2 < D12w/fw < 0.6 \quad (12\text{-}1)$$

Further, the variable magnification optical system according to the present embodiment preferably satisfies a conditional expression (13) given below.

$$1.2 < f4/fw < 2.6 \quad (13)$$

where, f4: focal length of the fourth lens group G4.

The conditional expression (13) defines the refractive power distribution of the fourth lens group G4 with respect to the entire system. If the system falls below the lower limit of the conditional expression (13), the afocal variable magnification system of the first lens group G1 to the third lens group needs to be further shifted to the larger side, whereby the refractive power of each lens group needs to be increased and the imaging performance cannot be maintained uniformly and favorably over the entire system, as described above. Further, the back focus of the entire system is reduced and the configuration of the fourth lens group G4 cannot deal with this. If the system exceeds the upper limit of the conditional expression (13), the refractive power of the fourth lens group G4 is preferably reduced but the aperture diameter of the stop is also increased and the maximum aperture F-number needs to be darkened or the lens system needs to be increased, which would defeat the object of the present invention.

Note that the system can be a further high performance variable magnification optical system by satisfying a conditional expression (13-1) given below.

$$1.5 < f4/fw < 2.2 \quad (13\text{-}1)$$

In the present variable magnification optical system, as the material disposed on the most object side, in particular, glass is preferable, or transparent ceramics may be used.

In the case where the present variable magnification optical system is used under severe environmental conditions, a multi-layer film coating is preferably applied. Further, an antireflection coating for reducing ghost light and the like when used may be provided, other than the protection coating.

FIG. 1 illustrates an example case in which an optical member PP is disposed between the variable magnification optical system and image plane Sim, but, instead of disposing various types of filters, such as a low-pass filter, a filter that will cut a particular wavelength range, and the like, as the optical member PP, the filters may be disposed between each lens or a coating having an identical effect to that of the filter may be provided on a lens surface of any of the lenses.

Figure 2:
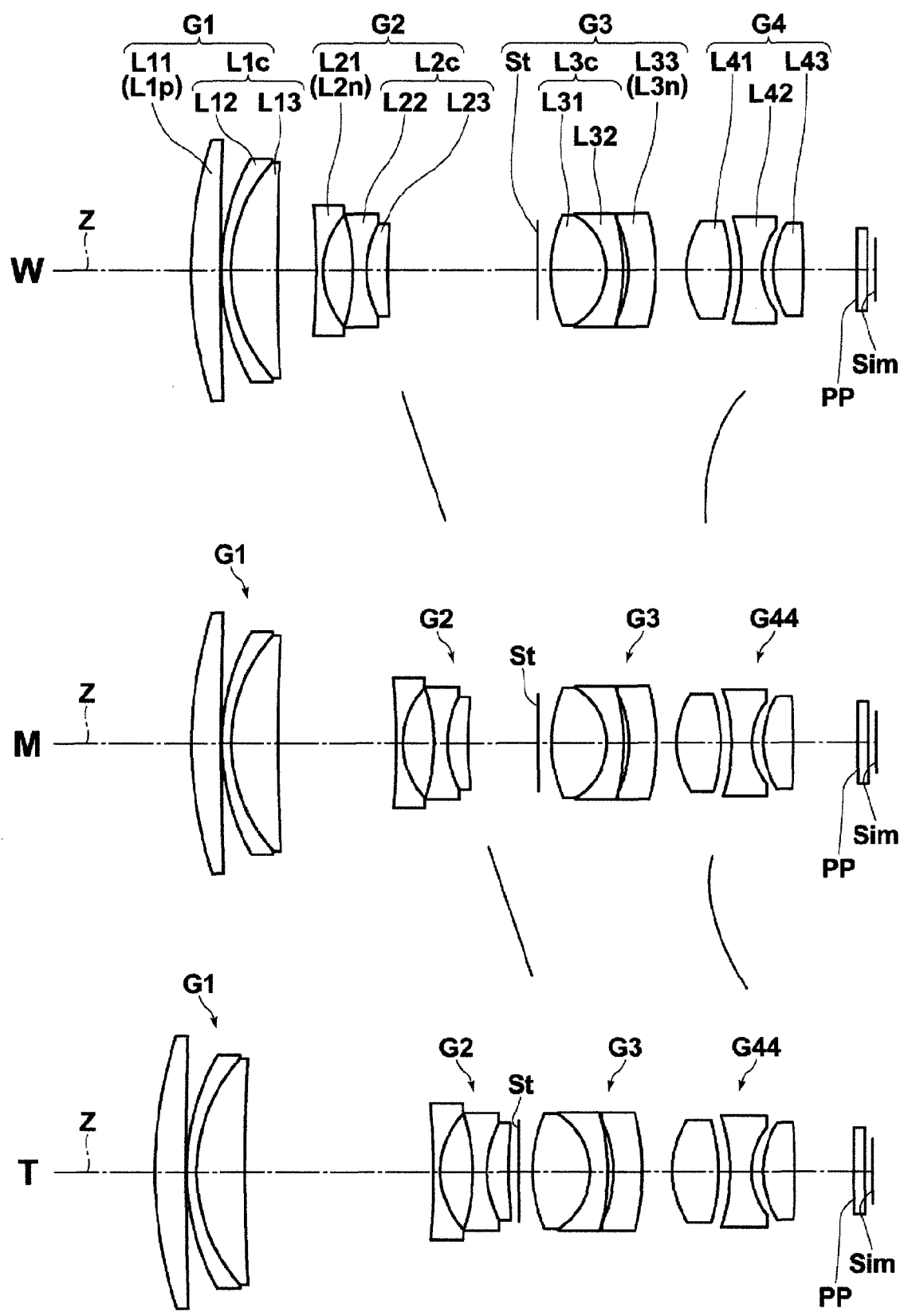
FIG. 2 is a cross-sectional view of a variable magnification optical system of Example 2, illustrating a lens configuration thereof.
Figure 3:
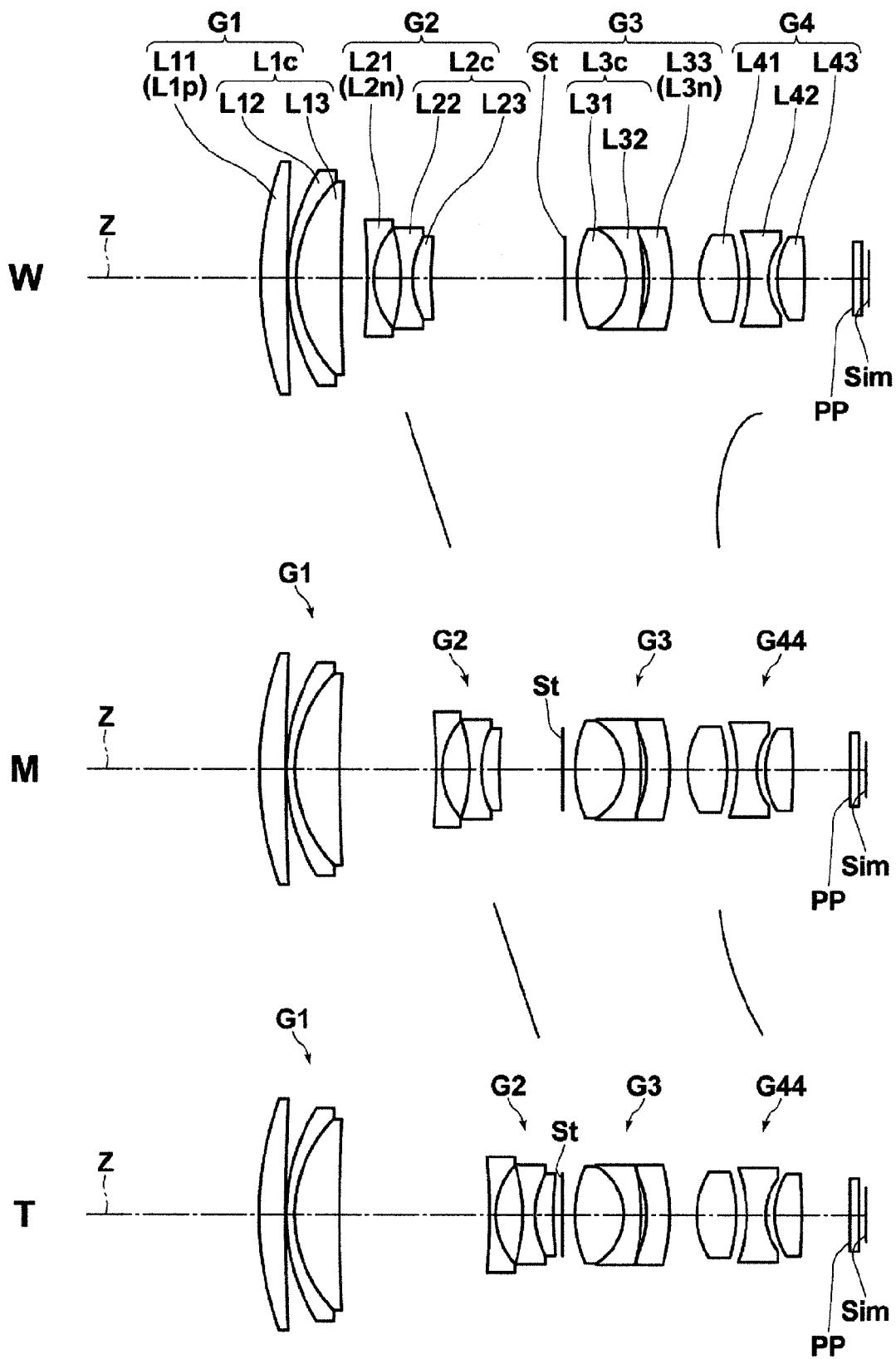
FIG. 3 is a cross-sectional view of a variable magnification optical system of Example 3, illustrating a lens configuration thereof.
Figure 4:
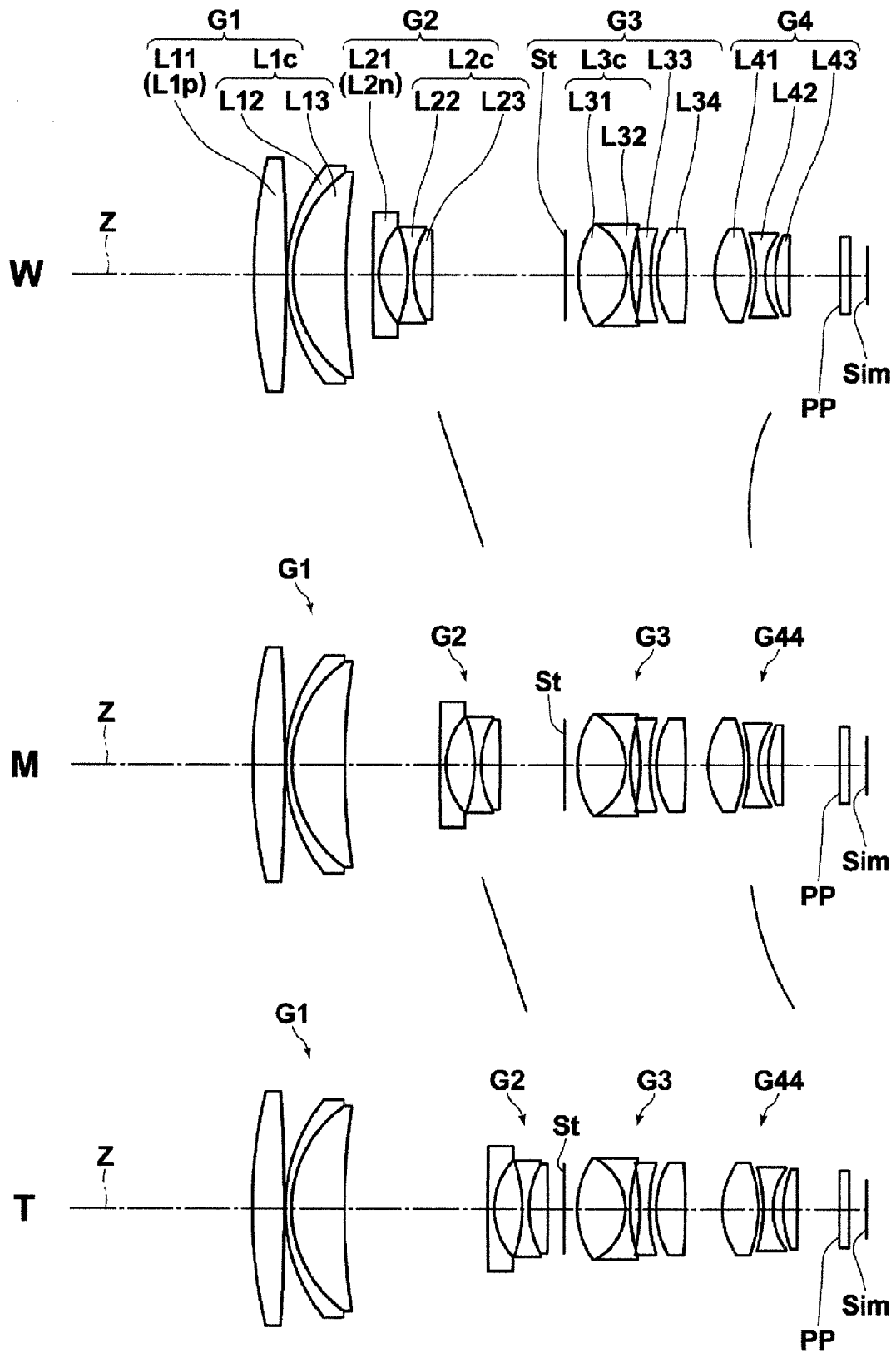
FIG. 4 is a cross-sectional view of a variable magnification optical system of Example 4, illustrating a lens configuration thereof.
Figure 6:
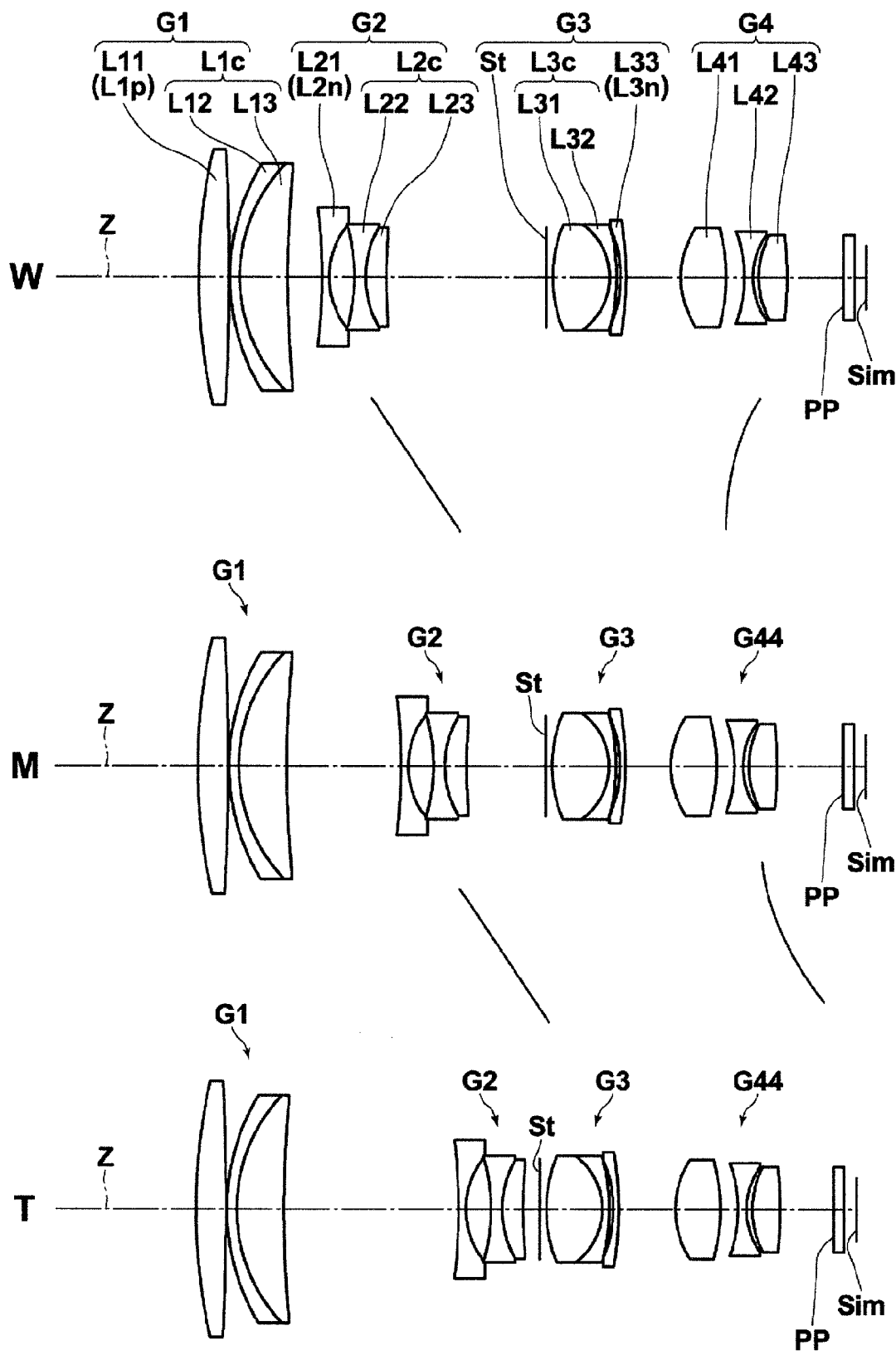
FIG. 6 is a cross-sectional view of a variable magnification optical system of Example 6, illustrating a lens configuration thereof.
Figure 7:
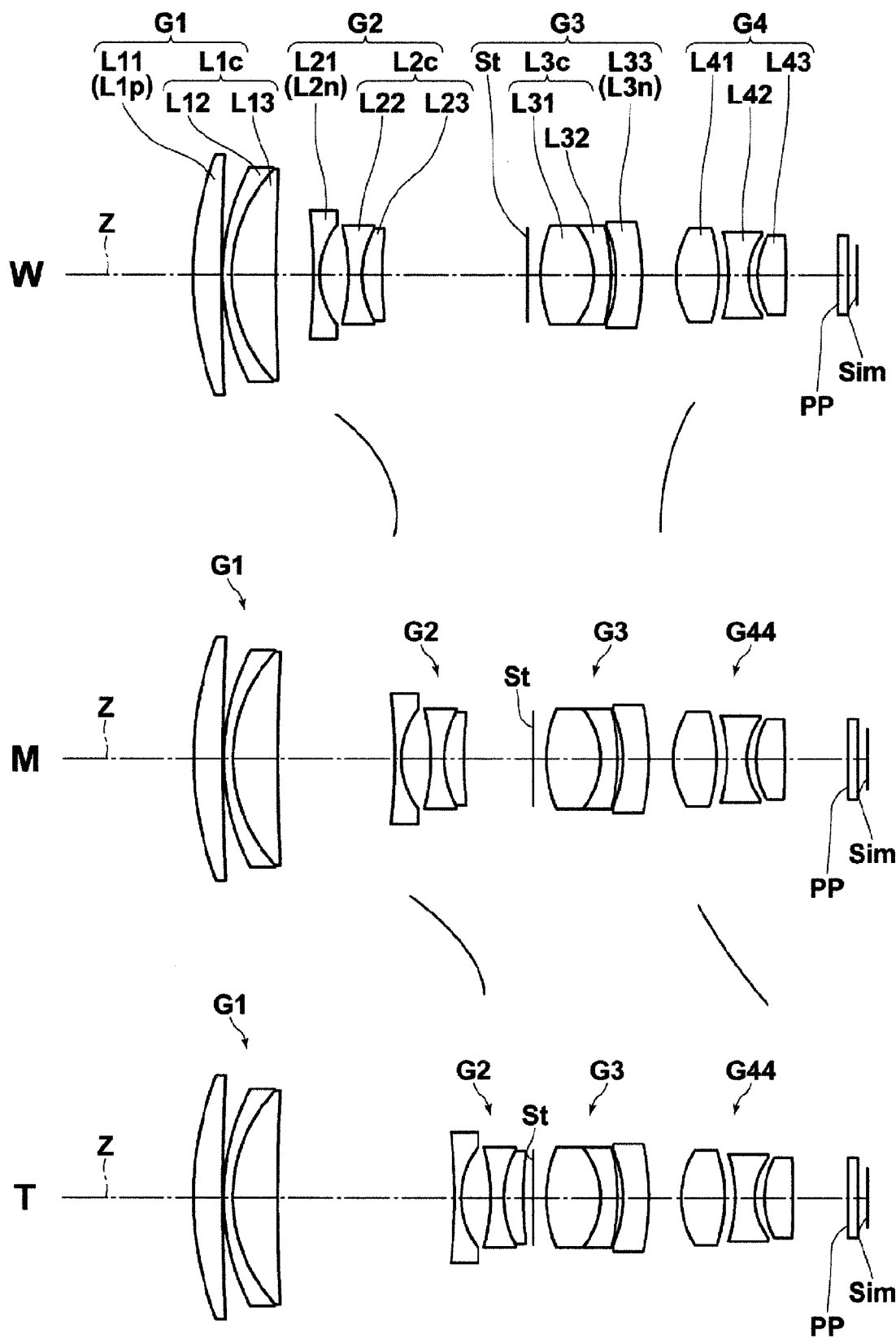
FIG. 7 is a cross-sectional view of a variable magnification optical system of Example 7, illustrating a lens configuration thereof.
Figure 8:
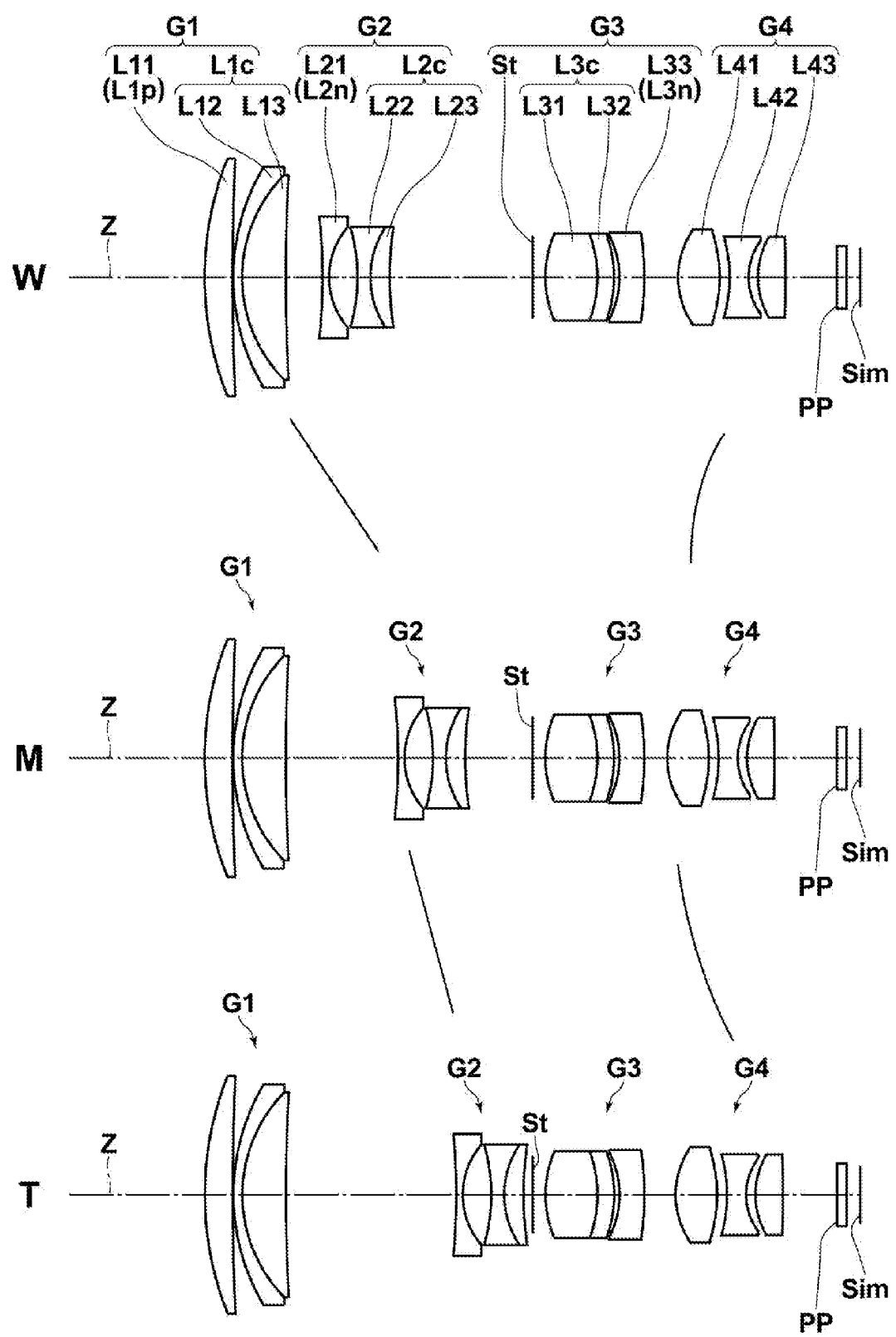
FIG. 8 is a cross-sectional view of a variable magnification optical system of Example 8, illustrating a lens configuration thereof.

Numerical examples of the variable magnification optical system of the present invention will now be described. Note that Example 2 is shown as a reference example. A cross-sectional view illustrating a lens configuration of a variable magnification optical system of Example 1 is shown in FIG. 1, a cross-sectional view illustrating a lens configuration of a variable magnification optical system of Example 2 is shown in FIG. 2, a cross-sectional view illustrating a lens configuration of a variable magnification optical system of Example 3 is shown in FIG. 3, a cross-sectional view illustrating a lens configuration of a variable magnification optical system of Example 4 is shown in FIG. 4, a cross-sectional view illustrating a lens configuration of a variable magnification optical system of Example 5 is shown in FIG. 5, a cross-sectional view illustrating a lens configuration of a variable magnification optical system of Example 6 is shown in FIG. 6, a cross-sectional view illustrating a lens configuration of a variable magnification optical system of Example 7 is shown in FIG. 7, and a cross-sectional view illustrating a lens configuration of a variable magnification optical system of Example 8 is shown in FIG. 8.

FIGS. 1 to 8 also include the optical member PP, left side of the drawings is the object side while the right side is image side, and the aperture stop St shown in the drawings does not necessarily represent the size and shape thereof but indicates the position on the optical axis Z.

Lens data, moving surface distance data, specification data, and aspherical surface data of the variable magnification optical system of Example 1 are shown in Tables 1, 2, 3, and 4 respectively. Lens data, moving surface distance data, specification data, and aspherical surface data of the variable magnification optical system of Example 2 are shown in Tables 5, 6, 7, and 8 respectively. Lens data, moving surface distance data, specification data, and aspherical surface data of the variable magnification optical system of Example 3 are shown in Tables 9, 10, 11, and 12 respectively. Lens data, moving surface distance data, specification data, and aspherical surface data of the variable magnification optical system of Example 4 are shown in Tables 13, 14, 15, and 16 respectively. Lens data, moving surface distance data, specification data, and aspherical surface data of the variable magnification optical system of Example 5 are shown in Tables 17, 18, 19, and 20 respectively. Lens data, moving surface distance data, specification data, and aspherical surface data of the variable magnification optical system of Example 6 are shown in Tables 21, 22, 23, and 24 respectively. Lens data, moving surface distance data, specification data, and aspherical surface data of the variable magnification optical system of Example 7 are shown in Tables 25, 26, 27, and 28 respectively. Lens data, moving surface distance data, specification data, and aspherical surface data of the variable magnification optical system of Example 8 are shown in Tables 29, 30, 31, and 32 respectively.

Meanings of the symbols in the tables will be described herein below, by taking those of Example 1 as example, but the same applies basically to Examples 2 to 8.

In the lens data shown in Table 1, the Si column indicates $i^{th}$ surface number in which a number i (i=1, 2, 3, - - -) is given to each surface in a serially increasing manner toward the image side with the most object side constituent element surface being taken as the first surface. The Ri column indicates the radius of curvature of $i^{th}$ surface and the Di column indicates the surface distance between $i^{th}$ surface and $(i+1)^{th}$ surface on the optical axis Z. The Ndi column indicates the refractive index of medium between $i^{th}$ surface and $(i+1)^{th}$ surface with respect to the d-line (wavelength of 587.6 nm), and the vdj column indicates the Abbe number of $j^{th}$ optical element with respect to the d-line in which a number j (j=1, 2, 3, - - -) is given to each optical element in a serially increasing manner toward the image side with the most object side optical element being taken as the first optical element.

Note that the sign of the radius of curvature is positive if the surface shape is convex on the object side and negative if it is convex on the image side. The lens data also include the aperture stop St, the optical member PP, and the image plane. The word (Stop) is indicated with the surface number in the row corresponding to the aperture stop St in the surface number column. Likewise, the word (Image Plane) is indicated with the surface number in the row corresponding to the image plane in the surface number column. Further, in the lens data of Table 1, the surface distance row whose surface distance varies during magnification change and focusing is indicated as dn (n is surface number).

Moving surface distance data of Table 2 indicate a surface distance dn (n is surface number) at each of the wide angle end (W), the intermediate angle of view (M), and the telephoto end (T).

The specification data of Table 3 indicate values of focal length f', F-number FNO, and total angle of view 2ω.

In the lens data, the moving surface distance data, and the specification data, mm is used as the unit of length and degree is used as the unit of angle, but other appropriate units may also be used, as optical systems are usable even when they are proportionally increased or decreased.

In the lens data shown in Table 1, an asterisk mark * is attached to the surface number of aspherical surface and a value of paraxial radius of curvature is shown as the radius of curvature of the aspherical surface. The aspherical surface data shown in Table 4 indicate surface numbers of aspherical surfaces and aspherical surface coefficients of each aspherical surface. The aspherical surface coefficients represent values of coefficients κ and Am (m=4, 6, 8, 10, 12, 14, 16, 18) in an aspherical surface expression (A) given below.

$$Zd = C \cdot h^2 / \{1 + (1 - \kappa \cdot C^2 \cdot h^2)^{1/2}\} + \Sigma Am \cdot h^m \quad (A)$$

where,

Zd: depth of aspheric surface (length of vertical line from a point on the aspheric surface at height h to a flat surface orthogonal to the optical axis to which the aspherical apex contacts), h: height (distance from the optical axis to lens surface), C: inverse of paraxial radius of curvature, and κ, Am: aspherical surface coefficients (m=4, 6, 8, 10, 12, 14, 16, 18).

TABLE 1

Example 1·Lens Data (n, ν: d-line)

| Si (Surface No.) | Ri (Radius of Curvature) | Di (Surface Distance) | Ndi (Refractive Index) | ν dj (Abbe Number) |
|---|---|---|---|---|
| 1 | 51.839 | 4.390 | 1.49700 | 81.6 |
| 2 | 774.380 | 0.100 | 1.00000 | |
| 3 | 32.913 | 1.400 | 1.80000 | 29.9 |
| 4 | 23.269 | 7.409 | 1.49700 | 81.6 |
| 5 | 190.780 | d5 | 1.00000 | |
| 6 | −114.452 | 1.000 | 1.60644 | 43.7 |
| 7 | 11.866 | 4.483 | 1.00000 | |
| 8 | −26.375 | 2.000 | 1.51742 | 52.4 |
| 9 | 14.492 | 3.000 | 1.84666 | 23.8 |
| 10 | 56.659 | d10 | 1.00000 | |
| 11(Stop) | 0.000 | 2.036 | 1.00000 | |
| 12 | 19.254 | 8.100 | 1.49700 | 81.6 |
| 13 | −9.250 | 2.870 | 1.48749 | 70.2 |
| 14 | −33.075 | 0.870 | 1.00000 | |
| 15 | −16.285 | 3.840 | 1.62004 | 36.3 |
| 16 | −32.499 | d16 | 1.00000 | |
| 17* | 12.879 | 6.500 | 1.56865 | 58.6 |
| 18* | −21.313 | 1.686 | 1.00000 | |
| 19 | −23.313 | 3.000 | 1.69895 | 30.1 |
| 20 | 9.841 | 1.496 | 1.00000 | |
| 21 | 12.799 | 4.648 | 1.77250 | 49.6 |
| 22 | −98.486 | d22 | 1.00000 | |
| 23 | ∞ | 1.500 | 1.51633 | 64.1 |
| 24 | ∞ | 1.171 | 1.00000 | |
| 25 (Image Plane) | ∞ | | | |

TABLE 2

Example 1·Distance Data

| | W | M | T |
|---|---|---|---|
| d5 | 3.905 | 15.477 | 24.432 |
| d10 | 22.020 | 10.448 | 1.493 |
| d16 | 4.436 | 2.955 | 4.470 |
| d22 | 8.000 | 9.481 | 7.966 |

TABLE 3

Example 1·Specs(d-line)

| | W | M | T |
|---|---|---|---|
| f' | 12.460 | 24.920 | 48.844 |
| FNO | 1.57 | 1.67 | 1.85 |
| 2ω | 41.35 | 20.37 | 10.25 |

TABLE 4

Example 1 · Aspherical Surface Data

| Si | κ | A4 | A6 | A8 | A10 | A12 |
|---|---|---|---|---|---|---|
| 17* | −2.91184 | 1.990E−04 | −1.421E−06 | 1.859E−08 | −2.184E−10 | −2.083E−13 |
| 18* | 4.85492 | 1.172E−04 | 4.463E−07 | −7.668E−09 | −1.707E−12 | −7.955E−17 |

TABLE 5

Example 2·Lens Data (n, ν: d-line)

| Si (Surface No.) | Ri (Radius of Curvature) | Di (Surface Distance) | Ndi (Refractive Index) | ν dj (Abbe Number) |
|---|---|---|---|---|
| 1 | 60.254 | 4.390 | 1.49700 | 81.6 |
| 2 | 587.302 | 0.100 | | |
| 3 | 32.734 | 1.400 | 1.80000 | 29.9 |
| 4 | 23.371 | 6.800 | 1.49700 | 81.6 |
| 5 | 318.238 | d5 | | |
| 6 | −114.452 | 1.000 | 1.60562 | 43.7 |
| 7 | 11.866 | 4.483 | | |
| 8 | −26.375 | 2.000 | 1.51742 | 52.4 |
| 9 | 14.492 | 3.000 | 1.84666 | 23.8 |
| 10 | 56.659 | d10 | | |
| 11(Stop) | 0.000 | 1.954 | | |
| 12 | 19.582 | 8.100 | 1.49700 | 81.6 |
| 13 | −9.337 | 2.440 | 1.48749 | 70.2 |
| 14 | −30.275 | 0.808 | | |
| 15 | −16.285 | 4.000 | 1.62004 | 36.3 |
| 16 | −32.597 | d16 | | |
| 17* | 12.868 | 6.500 | 1.56865 | 58.6 |
| 18* | −21.403 | 1.604 | | |
| 19 | −24.134 | 3.000 | 1.69895 | 30.1 |
| 20 | 9.794 | 1.651 | | |
| 21 | 12.971 | 4.339 | 1.77250 | 49.6 |
| 22 | −101.969 | d22 | | |
| 23 | ∞ | 1.500 | 1.51633 | 64.1 |
| 24 | ∞ | 1.195 | | |
| 25 (Image Plane) | ∞ | | | |

TABLE 6

Example 2·Distance Data

| | W | M | T |
|---|---|---|---|
| d5 | 5.685 | 17.378 | 1.436 |
| d10 | 22.046 | 10.353 | 4.223 |
| d16 | 4.554 | 2.994 | 8.331 |
| d22 | 8.000 | 9.560 | 0.303 |

TABLE 7

Example 2·Specs(d-line)

| | W | M | T |
|---|---|---|---|
| f' | 12.499 | 24.997 | 48.495 |
| FNO | 1.56 | 1.66 | 1.84 |
| 2ω | 40.89 | 20.21 | 10.30 |

TABLE 8

Example 2 • Aspherical Surface Data

| Si | κ | A4 | A6 | A8 | A10 | A12 | A14 | A16 | A18 |
|---|---|---|---|---|---|---|---|---|---|
| 17* | 1.02879 | −1.968E−05 | −2.533E−07 | 4.861E−09 | −1.032E−10 | −7.857E−14 | −3.591E−17 | −1.300E−20 | −4.125E−24 |
| 18* | 4.84403 | 1.282E−04 | 5.017E−08 | −1.304E−09 | −5.418E−13 | −1.148E−16 | −1.113E−20 | 2.487E−24 | 1.792E−27 |

TABLE 9

Example 3•Lens Data (n, ν: d-line)

| Si (Surface No.) | Ri (Radius of Curvature) | Di (Surface Distance) | Ndi (Refractive Index) | ν dj (Abbe Number) |
|---|---|---|---|---|
| 1 | 56.034 | 4.390 | 1.48749 | 70.2 |
| 2 | 439.081 | 0.100 | | |
| 3 | 33.061 | 1.400 | 1.71736 | 29.5 |
| 4 | 22.371 | 7.400 | 1.49700 | 81.6 |
| 5 | 333.790 | d5 | | |
| 6 | −114.452 | 1.000 | 1.60562 | 43.7 |
| 7 | 11.866 | 4.483 | | |
| 8 | −26.375 | 2.000 | 1.51742 | 52.4 |
| 9 | 9.000 | 3.000 | 1.84666 | 23.8 |
| 10 | 56.659 | d10 | | |
| 11(Stop) | 0.000 | 2.043 | | |
| 12 | 19.243 | 8.100 | 1.49700 | 81.6 |
| 13 | −9.250 | 2.870 | 1.48749 | 70.2 |
| 14 | −33.075 | 0.870 | | |
| 15 | −16.285 | 3.840 | 1.62004 | 36.3 |
| 16 | −32.499 | d16 | | |
| 17* | 12.923 | 6.500 | 1.56865 | 58.6 |
| 18* | −21.215 | 1.685 | | |
| 19 | −23.260 | 3.150 | 1.69895 | 30.1 |
| 20 | 9.841 | 1.475 | | |
| 21 | 12.799 | 4.490 | 1.77250 | 49.6 |
| 22 | −97.795 | d22 | | |
| 23 | ∞ | 1.500 | 1.51633 | 64.1 |
| 24 | ∞ | 1.205 | | |
| 25 (Image Plane) | ∞ | | | |

TABLE 10

Example 3•Distance Data

| | W | M | T |
|---|---|---|---|
| d5 | 4.246 | 15.812 | 24.770 |
| d10 | 22.013 | 10.449 | 1.491 |
| d16 | 4.436 | 2.948 | 4.478 |
| d22 | 8.000 | 9.488 | 7.958 |

TABLE 11

Example 3•Specs(d-line)

| | W | M | T |
|---|---|---|---|
| f | 12.463 | 24.925 | 48.854 |
| FNO | 1.64 | 1.67 | 1.86 |
| 2ω | 41.28 | 20.32 | 10.23 |

TABLE 12

Example 3 • Aspherical Surface Data

| Si | κ | A4 | A6 | A8 | A10 | A12 | A14 | A16 | A18 |
|---|---|---|---|---|---|---|---|---|---|
| 17* | 0.07785 | 3.346E−05 | 1.879E−07 | −4.190E−09 | −9.648E−12 | −5.507E−15 | −2.160E−18 | −7.084E−22 | −2.097E−25 |
| 18* | 3.54973 | 1.175E−04 | −3.138E−07 | −1.718E−09 | −2.353E−14 | 1.553E−16 | 7.225E−20 | 2.332E−23 | 6.424E−27 |

TABLE 13

Example 4•Lens Data (n, ν: d-line)

| Si (Surface No.) | Ri (Radius of Curvature) | Di (Surface Distance) | Ndi (Refractive Index) | ν dj (Abbe Number) |
|---|---|---|---|---|
| 1 | 79.873 | 5.037 | 1.49700 | 81.6 |
| 2 | −317.761 | 0.100 | | |
| 3 | 26.608 | 1.000 | 1.71736 | 29.5 |
| 4 | 19.639 | 8.350 | 1.49700 | 81.6 |
| 5 | 117.809 | d5 | | |
| 6 | 587.517 | 1.000 | 1.80000 | 29.9 |
| 7 | 10.978 | 4.450 | | |
| 8 | −21.718 | 1.000 | 1.57250 | 57.8 |
| 9 | 14.118 | 3.000 | 1.84666 | 23.8 |
| 10 | −276.210 | d10 | | |
| 11(Stop) | 0.000 | 2.000 | | |
| 12 | 13.653 | 7.600 | 1.49700 | 81.6 |
| 13 | −9.000 | 0.740 | 1.48749 | 70.2 |
| 14 | 23.734 | 1.503 | | |
| 15* | −27.678 | 1.500 | 1.50956 | 56.2 |
| 16* | 44.278 | 1.060 | | |
| 17 | 14.793 | 4.538 | 1.49700 | 81.6 |
| 18 | 18.000 | d18 | | |
| 19* | 11.538 | 5.723 | 1.50956 | 56.2 |
| 20* | −17.056 | 0.782 | | |
| 21 | −22.527 | 1.500 | 1.60596 | 26.9 |
| 22 | 10.835 | 1.601 | | |
| 23 | 16.856 | 2.200 | 1.80400 | 46.6 |
| 24 | 848.781 | d24 | | |
| 25 | ∞ | 1.500 | 1.51633 | 64.1 |
| 26 | ∞ | 2.759 | | |
| 25 (Image Plane) | ∞ | | | |

TABLE 14

Example 4•Distance Data

|  | W | M | T |
|---|---|---|---|
| d5 | 4.211 | 14.840 | 22.435 |
| d10 | 20.790 | 10.161 | 2.566 |
| d18 | 4.432 | 3.505 | 5.805 |
| d24 | 8.000 | 8.927 | 6.627 |

TABLE 15

Example 4•Specs(d-line)

|  | W | M | T |
|---|---|---|---|
| f | 12.453 | 24.906 | 47.819 |
| FNO | 1.54 | 1.58 | 1.70 |
| 2ω | 39.94 | 20.08 | 10.35 |

TABLE 16

Example 4 • Aspherical Surface Data

| Si | κ | A4 | A6 | A8 | A10 | A12 | A14 | A16 | A18 |
|---|---|---|---|---|---|---|---|---|---|
| 15* | 8.8651507 | 1.610E−04 | −3.513E−07 | −1.498E−10 | −1.125E−13 | 0.000E+00 | 0.000E+00 | 0.000E+00 | 0.000E+00 |
| 16* | 0.1270171 | 2.176E−04 | 2.332E−07 | 9.571E−11 | 4.595E−14 | 0.000E+00 | 0.000E+00 | 0.000E+00 | 0.000E+00 |
| 19* | −1.2132294 | 1.079E−04 | 5.172E−08 | 1.500E−09 | 2.423E−12 | 8.360E−16 | 1.970E−19 | 4.039E−23 | 8.451E−27 |
| 20* | 2.8710917 | 1.306E−04 | 4.214E−07 | 4.836E−09 | −6.877E−14 | −4.303E−16 | −1.864E−19 | −5.894E−23 | −1.629E−26 |

TABLE 17

Example 5•Lens Data (n, ν: d-line)

| Si (Surface No.) | Ri (Radius of Curvature) | Di (Surface Distance) | Ndi (Refractive Index) | ν dj (Abbe Number) |
|---|---|---|---|---|
| 1 | 51.430 | 4.387 | 1.49700 | 81.6 |
| 2 | 435.971 | 0.100 |  |  |
| 3 | 34.524 | 1.400 | 1.80610 | 33.3 |
| 4 | 23.295 | 6.800 | 1.49700 | 81.6 |
| 5 | 320.451 | d5 |  |  |
| 6 | −94.996 | 1.000 | 1.60562 | 43.7 |
| 7 | 12.213 | 4.457 |  |  |
| 8 | −28.383 | 2.000 | 1.51742 | 52.4 |
| 9 | 14.366 | 3.000 | 1.84666 | 23.8 |
| 10 | 52.415 | d10 |  |  |
| 11(Stop) | 0.000 | 1.976 |  |  |
| 12 | 19.396 | 8.100 | 1.49700 | 81.6 |
| 13 | −9.208 | 2.609 | 1.48749 | 70.2 |
| 14 | −30.772 | 0.836 |  |  |
| 15 | −15.927 | 3.912 | 1.62004 | 36.3 |
| 16 | −31.747 | d16 |  |  |
| 17* | 12.889 | 6.500 | 1.56865 | 58.6 |
| 18* | −20.587 | 1.538 |  |  |
| 19 | −23.394 | 2.960 | 1.69895 | 30.1 |
| 20 | 9.760 | 1.456 |  |  |
| 21 | 12.687 | 4.302 | 1.78800 | 47.4 |
| 22 | −150.919 | d22 |  |  |
| 23 | ∞ | 1.500 | 1.51633 | 64.1 |
| 24 | ∞ | 0.595 |  |  |
| 25 (Image Plane) | ∞ |  |  |  |

TABLE 18

Example 5•Distance Data

|  | W | M | T |
|---|---|---|---|
| d5 | 5.719 | 17.543 | 26.557 |
| d10 | 22.294 | 10.470 | 1.456 |
| d16 | 5.254 | 3.688 | 4.880 |
| d22 | 8.000 | 9.566 | 8.374 |

TABLE 19

Example 5•Specs(d-line)

|  | W | M | T |
|---|---|---|---|
| f | 12.551 | 25.102 | 48.698 |
| FNO | 1.56 | 1.66 | 1.84 |
| 2ω | 40.73 | 20.07 | 10.24 |

TABLE 20

Example 5 • Aspherical Surface Data

| Si | κ | A4 | A6 | A8 | A10 | A12 | A14 | A16 | A18 |
|---|---|---|---|---|---|---|---|---|---|
| 17* | 1.00000 | −2.238E−05 | −1.679E−08 | 2.215E−09 | −1.033E−10 | −6.140E−14 | −2.279E−17 | −6.790E−21 | −1.770E−24 |
| 18* | 1.00000 | 7.272E−05 | 2.657E−07 | −1.444E−08 | 4.095E−11 | 2.470E−14 | 8.866E−18 | 2.549E−21 | 6.431E−25 |

TABLE 21

Example 6•Lens Data (n, ν: d-line)

| Si (Surface No.) | Ri (Radius of Curvature) | Di (Surface Distance) | Ndi (Refractive Index) | ν dj (Abbe Number) |
|---|---|---|---|---|
| 1 | 78.727 | 4.387 | 1.49700 | 81.6 |
| 2 | −332.732 | 0.100 | | |
| 3 | 30.485 | 1.400 | 1.80518 | 25.4 |
| 4 | 23.000 | 6.800 | 1.49700 | 81.6 |
| 5 | 164.276 | d5 | | |
| 6 | −80.980 | 1.000 | 1.60562 | 43.7 |
| 7 | 11.585 | 3.600 | | |
| 8 | −26.317 | 1.600 | 1.51742 | 52.4 |
| 9 | 13.913 | 3.000 | 1.84666 | 23.8 |
| 10 | 66.148 | d10 | | |
| 11(Stop) | 0.000 | 1.000 | | |
| 12 | 19.280 | 8.100 | 1.48563 | 85.2 |
| 13 | −9.200 | 1.000 | 1.48749 | 70.2 |
| 14 | −26.553 | 0.549 | | |
| 15 | −17.471 | 0.800 | 1.64769 | 33.8 |
| 16 | −47.226 | d16 | | |
| 17* | 12.543 | 6.500 | 1.56865 | 58.6 |
| 18* | −21.430 | 2.560 | | |
| 19 | −18.960 | 1.211 | 1.69895 | 30.1 |
| 20 | 10.170 | 0.847 | | |
| 21 | 12.543 | 4.000 | 1.78590 | 44.2 |
| 22 | −59.626 | d22 | | |
| 23 | ∞ | 1.500 | 1.51633 | 64.1 |
| 24 | ∞ | 1.736 | | |
| 25 (Image Plane) | ∞ | | | |

TABLE 22

Example 6•Distance Data

| | W | M | T |
|---|---|---|---|
| d5 | 4.831 | 16.220 | 25.053 |
| d10 | 22.563 | 11.174 | 2.341 |
| d16 | 7.714 | 6.390 | 8.074 |
| d22 | 8.000 | 9.324 | 7.640 |

TABLE 23

Example 8•Specs(d-line)

| | W | M | T |
|---|---|---|---|
| f | 12.529 | 25.058 | 48.111 |
| FNO | 1.58 | 1.67 | 1.83 |
| 2ω | 40.88 | 20.13 | 10.35 |

TABLE 25

Example 7•Lens Data (n, ν: d-line)

| Si (Surface No.) | Ri (Radius of Curvature) | Di (Surface Distance) | Ndi (Refractive Index) | ν dj (Abbe Number) |
|---|---|---|---|---|
| 1 | 51.430 | 4.387 | 1.49700 | 81.6 |
| 2 | 435.971 | 0.100 | | |
| 3 | 34.524 | 1.400 | 1.80518 | 25.4 |
| 4 | 23.295 | 6.800 | 1.49700 | 81.6 |
| 5 | 320.451 | d5 | | |
| 6 | −94.996 | 1.000 | 1.60562 | 43.7 |
| 7 | 12.213 | 4.457 | | |
| 8 | −28.383 | 2.000 | 1.51742 | 52.4 |
| 9 | 14.366 | 3.000 | 1.84866 | 23.8 |
| 10 | 52.415 | d10 | | |
| 11(Stop) | 0.000 | 1.976 | | |
| 12 | 19.766 | 8.100 | 1.48563 | 85.2 |
| 13 | −12.018 | 2.609 | 1.51633 | 64.1 |
| 14 | −29.294 | 0.836 | | |
| 15 | −17.642 | 3.912 | 1.64769 | 33.8 |
| 16 | −36.542 | d16 | | |
| 17* | 12.889 | 6.500 | 1.56865 | 58.6 |
| 18* | −20.587 | 1.538 | | |
| 19 | −23.394 | 2.960 | 1.69895 | 30.1 |
| 20 | 9.760 | 1.456 | | |
| 21 | 12.687 | 4.302 | 1.78590 | 44.2 |
| 22 | −150.919 | d22 | | |
| 23 | ∞ | 1.500 | 1.51633 | 64.1 |
| 24 | ∞ | 1.473 | | |
| 25 (Image Plane) | ∞ | | | |

TABLE 26

Example 7•Distance Data

| | W | M | T |
|---|---|---|---|
| d5 | 5.719 | 17.531 | 26.555 |
| d10 | 22.294 | 10.482 | 1.458 |
| d16 | 5.254 | 3.683 | 4.877 |
| d22 | 8.000 | 9.571 | 8.377 |

TABLE 27

Example 7•Specs(d-line)

| | W | M | T |
|---|---|---|---|
| f | 12.577 | 25.154 | 48.799 |
| FNO | 1.58 | 1.68 | 1.85 |
| 2ω | 40.65 | 20.04 | 10.22 |

TABLE 24

Example 6 • Aspherical Surface Data

| Si | κ | A4 | A6 | A8 | A10 | A12 | A14 | A16 | A18 |
|---|---|---|---|---|---|---|---|---|---|
| 17* | 0.88489 | −1.019E−05 | 8.530E−08 | −3.145E−11 | −9.779E−15 | −1.489E−18 | −8.572E−23 | 3.513E−26 | 1.906E−29 |
| 18* | 1.09396 | 9.870E−05 | −2.350E−07 | −1.777E−11 | 4.694E−15 | 2.460E−18 | 7.589E−22 | 1.948E−25 | 4.604E−29 |

TABLE 28

Example 7 • Aspherical Surface Data

| Si | κ | A4 | A6 | A8 | A10 | A12 | A14 | A16 | A18 |
|---|---|---|---|---|---|---|---|---|---|
| 17* | 1.00000 | −2.238E−05 | −1.679E−08 | 2.215E−09 | −1.033E−10 | −6.140E−14 | −2.279E−17 | −6.790E−21 | −1.770E−24 |
| 18* | 1.00000 | 7.272E−05 | 2.657E−07 | −1.444E−08 | 4.095E−11 | 2.470E−14 | 8.866E−18 | 2.549E−21 | 6.431E−25 |

TABLE 29

Example 8•Lens Data (n, ν: d-line)

| Si (Surface No.) | Ri (Radius of Curvature) | Di (Surface Distance) | Ndi (Refractive Index) | ν dj (Abbe Number) |
|---|---|---|---|---|
| 1 | 51.430 | 4.387 | 1.49700 | 81.6 |
| 2 | 435.971 | 0.100 | | |
| 3 | 34.524 | 1.400 | 1.80518 | 25.4 |
| 4 | 23.295 | 6.800 | 1.49700 | 81.6 |
| 5 | 320.451 | d5 | | |
| 6 | −94.996 | 1.000 | 1.60562 | 43.7 |
| 7 | 12.213 | 4.457 | | |
| 8 | −28.383 | 2.000 | 1.51742 | 52.4 |
| 9 | 14.366 | 3.000 | 1.84666 | 23.8 |
| 10 | 52.415 | d10 | | |
| 11(Stop) | 0.000 | 1.976 | | |
| 12 | 17.552 | 8.100 | 1.43875 | 95.0 |
| 13 | −20.000 | 2.609 | 1.43875 | 95.0 |
| 14 | −19.760 | 0.834 | | |
| 15 | −14.670 | 3.912 | 1.54814 | 45.8 |
| 16 | −46.517 | d16 | | |
| 17* | 12.889 | 6.500 | 1.56865 | 58.6 |
| 18* | −20.587 | 1.538 | | |
| 19 | −23.394 | 2.960 | 1.69895 | 30.1 |
| 20 | 9.760 | 1.456 | | |
| 21 | 12.687 | 4.302 | 1.78590 | 44.2 |
| 22 | −150.919 | d22 | | |
| 23 | ∞ | 1.500 | 1.51633 | 64.1 |
| 24 | ∞ | 1.473 | | |
| 25 (Image Plane) | ∞ | | | |

TABLE 30

Example 8•Distance Data

| | W | M | T |
|---|---|---|---|
| d5 | 5.719 | 17.483 | 26.546 |
| d10 | 22.294 | 10.530 | 1.467 |
| d16 | 5.254 | 3.566 | 4.845 |
| d22 | 8.000 | 9.688 | 8.409 |

TABLE 31

Example 8•Specs(d-line)

| | W | M | T |
|---|---|---|---|
| f′ | 13.052 | 26.104 | 50.643 |
| FNO | 1.81 | 1.82 | 1.92 |
| 2ω | 39.18 | 19.35 | 9.87 |

TABLE 32

Example 8 • Aspherical Surface Data

| Si | κ | A4 | A6 | A8 | A10 | A12 | A14 | A16 | A18 |
|---|---|---|---|---|---|---|---|---|---|
| 17* | 1.00000 | −2.238E−05 | −1.679E−08 | 2.215E−09 | −1.033E−10 | −6.140E−14 | −2.279E−17 | −6.790E−21 | −1.770E−24 |
| 18* | 1.00000 | 7.272E−05 | 2.657E−07 | −1.444E−08 | 4.095E−11 | 2.470E−14 | 8.866E−18 | 2.549E−21 | 6.431E−25 |

Values corresponding to the conditional expressions (1) to (13) of the variable magnification optical systems of Examples 1 to 8 are shown in Table 33. All examples use the d-line as the reference wavelength and the values shown in Table 33 are those at the reference wavelength.

TABLE 33

| Formula No. | Conditional Expression | Example 1 | Example 2 | Example 3 | Example 4 | Example 5 | Example 6 | Example 7 | Example 8 |
|---|---|---|---|---|---|---|---|---|---|
| (1) | f1/fw | 4.447 | 4.552 | 4.430 | 4.039 | 4.598 | 4.364 | 4.589 | 4.422 |
| (2) | f1p/f1c | 1.018 | 1.384 | 1.398 | 1.565 | 1.037 | 1.351 | 1.037 | 1.037 |
| (3) | R1c/f1 | 0.420 | 0.411 | 0.405 | 0.390 | 0.404 | 0.421 | 0.404 | 0.404 |
| (4) | FNt/FNw | 1.176 | 1.179 | 1.134 | 1.104 | 1.179 | 1.158 | 1.171 | 1.058 |
| (5) | FNt | 1.850 | 1.840 | 1.860 | 1.700 | 1.840 | 1.830 | 1.850 | 1.920 |
| (6) | f3/fw | 3.418 | 3.418 | 3.418 | 2.949 | 3.343 | 3.717 | 3.390 | 3.367 |
| (7) | f3c/f3 | 0.608 | 0.608 | 0.608 | 1.303 | 0.604 | 0.530 | 0.613 | 0.528 |
| (8) | f3n/f3 | −1.359 | −1.811 | −1.360 | −0.904 | −1.357 | −0.940 | −1.401 | −0.930 |
| (9) | νdn | 70.2 | 70.2 | 70.2 | 70.2 | 70.2 | 70.2 | 64.1 | 95.0 |
| (10) | abs(f2/fw) | 1.118 | 1.115 | 1.118 | 1.076 | 1.121 | 1.126 | 1.118 | 1.078 |

TABLE 33-continued

| Formula No. | Conditional Expression | Example 1 | Example 2 | Example 3 | Example 4 | Example 5 | Example 6 | Example 7 | Example 8 |
|---|---|---|---|---|---|---|---|---|---|
| (11) | β2w | −0.506 | −0.496 | −0.507 | −0.569 | −0.494 | −0.523 | −0.494 | −0.494 |
| (12) | D12w/fw | 0.313 | 0.455 | 0.341 | 0.338 | 0.456 | 0.386 | 0.455 | 0.438 |
| (13) | f4/fw | 1.896 | 1.910 | 1.903 | 1.964 | 1.891 | 1.722 | 1.887 | 1.818 |

Aberration diagrams of the variable magnification optical system of Example 1 are shown in A to I of FIG. 9. A to C of FIG. 9 respectively illustrate spherical aberration, field curvature, and distortion at the wide angle end (W), D to F of FIG. 9 respectively illustrate spherical aberration, field curvature, and distortion at the intermediate angle of view (M), and G to I of FIG. 9 respectively illustrate spherical aberration, field curvature, and distortion at the telephoto end (T).

Each aberration diagram representing the spherical aberration, the field curvature, and the distortion shows an aberration with the d-line (wavelength of 587.6 nm) as the reference wavelength. The spherical aberration diagrams illustrate aberrations with respect to the d-line (wavelength of 587.6 nm), the C-line (wavelength of 656.3 nm), and the g-line (wavelength of 435.8 nm) by the solid line, the dash dot line, and the broken line respectively. The field curvature diagrams illustrate aberrations in the sagittal direction and the tangential direction by the solid line and the broken line respectively.

Likewise, aberration diagrams of variable magnification optical system of Example 2 are shown in A to I of FIG. 10, aberration diagrams of variable magnification optical system of Example 3 are shown in A to I of FIG. 11, aberration diagrams of variable magnification optical system of Example 4 are shown in A to I of FIG. 12, aberration diagrams of variable magnification optical system of Example 5 are shown in A to I of FIG. 13, aberration diagrams of variable magnification optical system of Example 6 are shown in A to I of FIG. 14, aberration diagrams of variable magnification optical system of Example 7 are shown in A to I of FIG. 15, and aberration diagrams of variable magnification optical system of Example 8 are shown in A to I of FIG. 16.

It is known from the data described above that all variable magnification optical systems of Examples 1 to 8 satisfy the conditional expressions (1) to (13) and they are variable magnification optical systems which are bright even at the telephoto end while maintaining favorable performance.

Figure 17:
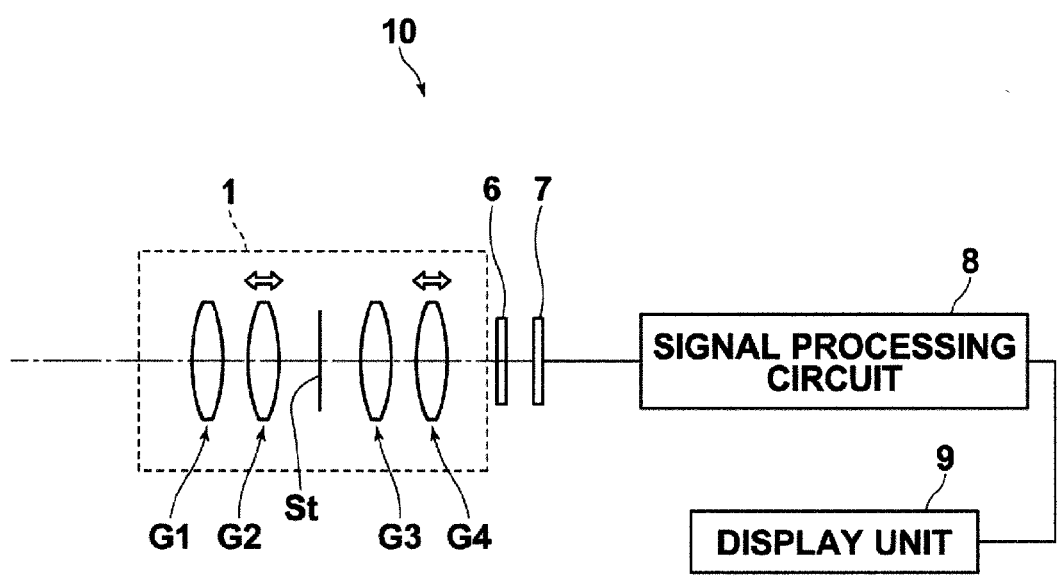
FIG. 17 is a schematic configuration diagram of an imaging apparatus according to an embodiment of the present invention.

Next, an imaging apparatus according to an embodiment of the present invention will be described. As an example imaging apparatus according to an embodiment of the present invention, a schematic configuration diagram of an imaging apparatus that uses a variable magnification optical system according to an embodiment of the present invention is shown in FIG. 17. Note that the first lens group G1 to the fourth lens group G4 included in the variable magnification optical system 1 are schematically illustrated in FIG. 17.

The video camera 10 includes the variable magnification optical system 1, a filter 6 having a function of low pass filter and infrared light cut filter disposed on the image side of the variable magnification optical system 1, an image sensor 7 disposed on the image side of the filter 6, and a signal processing circuit 8. The image sensor 7 converts an optical image formed by the variable magnification optical system 1 to an electrical signal and, for example, CCD (Charge Coupled Device), CMOS (Complementary Metal Oxide Semiconductor), or the like may be used as the image sensor 7. The image sensor 7 is disposed such that the imaging surface thereof corresponds to the image plane of the variable magnification optical system 1.

Generally, switching between the imaging in the visible region and the imaging in the near infrared region is implemented by the attachment/removal of the filter 6 (infrared light cut filter) and the image sensor 7 is not moved, and, therefore, the video camera 10 of the present embodiment employs such an embodiment and is formed such that the variation in longitudinal chromatic aberration due to the difference in wavelength region is eliminated as much as possible.

An image captured by the variable magnification optical system 1 is formed on the imaging plane of the image sensor 7 and an output signal of the image from the image sensor 7 is subjected to arithmetic processing in the signal processing circuit 8 and an image is displayed on the display unit 9.

FIG. 17 shows a so-called single plate imaging apparatus with one image sensor 7, but the imaging apparatus of the present invention may be a so-called three-plate imaging apparatus in which a color separation prism for separating each color of R (red), G (green), B (blue) is inserted between the variable magnification optical system 1 and the image sensor 7 and uses three image sensors corresponding to the respective colors.

So far, the present invention has been described by way of embodiments and Examples, but the present invention is not limited to the foregoing embodiments and Examples and various modifications may be made. For example, values of the radius of curvature of each lens element, surface distance, refractive index, Abbe number, aspherical surface coefficient, and the like are not limited to those illustrated in each numerical example and may take other values.

What is claimed is:

1. A variable magnification optical system, consisting of a first lens group fixed with respect to the imaging plane and has a positive refractive power, a second lens group having a negative refractive power, a third lens group fixed with respect to the imaging plane and has a positive refractive power, and a fourth lens group having a positive refractive power, arranged in order from the object side, in which magnification is changed by moving the second lens group and focusing is performed by moving the fourth lens group, wherein:

the first lens group consists of a positive lens L1p and a cemented lens L1c which consists of a negative lens and a positive lens, and has a positive refractive power, arranged in order from the object side;

the third lens group comprises a stop on the most object side;

the fourth lens group consists of a positive lens, a negative lens, and a positive lens, arranged in order from the object side, with at least one surface being an aspherical surface; and the variable magnification optical system satisfies conditional expressions given below:

$$3.1 < f1/fw < 8.0 \quad (1)$$

$$0.4 < f1p/f1c < 2.0 \quad (2)$$

$$0.3 < R1c/fw < 0.7 \quad (3)$$

$$1.0 \leq FNt/FNw < 1.4 \quad (4)$$

$$1.5 < FNt < 2.3 \quad (5)$$

where:
- f1: focal length of the first lens group;
- fw: focal length of the entire system at the wide angle end;
- f1p: focal length of the positive lens L1p;
- f1c: focal length of the cemented lens L1c;
- R1c: radius of curvature of the cemented surface of the cemented lens;
- FNt: maximum aperture F-number of the entire system at the telephoto end; and
- FNw: maximum aperture F-number of the entire system at the wide angle end.

2. The variable magnification optical system as claimed in claim 1, wherein the variable magnification optical system satisfies conditional expressions given below:

$$3.5 < f1/fw < 5.0 \quad (1\text{-}1)$$

$$0.8 < f1p/f1c < 1.9 \quad (2\text{-}1)$$

$$0.35 < R1c/fw < 0.5 \quad (3\text{-}1)$$

$$1.0 \le FNt/FNw < 1.3 \quad (4\text{-}1)$$

$$1.6 < FNt < 2.0 \quad (5\text{-}1).$$

3. The variable magnification optical system as claimed in claim 1, wherein:
the third lens group includes at least a stop, a cemented lens L3c which consists of a biconvex lens and a negative lens having a concave surface on the object side with an absolute value of radius of curvature smaller than that of the image side surface, and a negative lens L3n having a concave surface on the object side with an absolute value of radius of curvature smaller than that of the image side surface, arranged in order from the object side; and
the variable magnification optical system satisfies conditional expressions given below:

$$2.2 < f3/fw < 5.0 \quad (6)$$

$$0.3 < f3c/f3 < 2.0 \quad (7)$$

$$-2.5 < f3n/f3 < -0.4 \quad (8)$$

$$50 < vdn \le vdp \quad (9)$$

where:
- f3: focal length of the third lens group;
- f3c: focal length of the cemented lens L3c;
- f3n: focal length of the negative lens L3n;
- vdp: Abbe number of the positive lens in the cemented lens L3c; and
- vdn: Abbe number of the negative lens in the cemented lens L3c.

4. The variable magnification optical system as claimed in claim 3, wherein the variable magnification optical system satisfies conditional expressions given below:

$$2.5 < f3/fw < 4.0 \quad (6\text{-}1)$$

$$0.4 < f3c/f3 < 1.5 \quad (7\text{-}1)$$

$$-2.0 < f3n/f3 < -0.5 \quad (8\text{-}1)$$

$$60 < vdn \le vdp \quad (9\text{-}1).$$

5. The variable magnification optical system as claimed in claim 1, wherein:
the second lens group consists of a negative lens L2n and a cemented lens L2c which consists of a biconcave negative lens and a positive lens, arranged in order from the object side; and
the variable magnification optical system satisfies conditional expressions given below:

$$0.8 < |f2|/fw < 1.4 \quad (10)$$

$$-0.7 < \beta 2w < -0.3 \quad (11)$$

$$0.1 < D12w/fw < 0.7 \quad (12)$$

where:
- f2: focal length of the second lens group;
- β2w: imaging magnification of the second lens group at the wide angle end; and
- D12w: distance between the first lens group and the second lens group on the optical axis at the wide angle end.

6. The variable magnification optical system as claimed in claim 5, wherein the variable magnification optical system satisfies conditional expressions given below:

$$0.9 < |f2|/fw < 1.2 \quad (10\text{-}1)$$

$$-0.6 < \beta 2w < -0.4 \quad (11\text{-}1)$$

$$0.2 < D12w/fw < 0.6 \quad (12\text{-}1).$$

7. The variable magnification optical system as claimed in claim 1, wherein:
the fourth lens group consists of a biconvex lens, a negative lens having a concave surface on the image side with an absolute value of radius of curvature smaller than that of the object side surface, and a positive lens, arranged in order from the object side; and
the variable magnification optical system satisfies a conditional expression given below:

$$1.2 < f4/fw < 2.6 \quad (13)$$

where,
f4: focal length of the fourth lens group.

8. The variable magnification optical system as claimed in claim 7, wherein the variable magnification optical system satisfies a conditional expression given below:

$$1.5 < f4/fw < 2.2 \quad (13\text{-}1).$$

9. An imaging apparatus, comprising the variable magnification optical system as claimed in claim 1.

* * * * *